(12) United States Patent
Mitsuyama et al.

(10) Patent No.: US 6,549,661 B1
(45) Date of Patent: Apr. 15, 2003

(54) PATTERN RECOGNITION APPARATUS AND PATTERN RECOGNITION METHOD

(75) Inventors: Satoshi Mitsuyama, Tokyo (JP); Jun Motoike, Hitachinaka (JP); Hitoshi Matsuo, Musashino (JP); Yasuaki Kojima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/331,150

(22) PCT Filed: Dec. 25, 1996

(86) PCT No.: PCT/JP96/03789
§ 371 (c)(1),
(2), (4) Date: Jun. 17, 1999

(87) PCT Pub. No.: WO98/29833
PCT Pub. Date: Jul. 9, 1998

(51) Int. Cl.⁷ .................................................. G06K 9/62
(52) U.S. Cl. ...................... 382/224; 382/158; 382/133; 382/134; 356/39; 356/73
(58) Field of Search ................................ 382/132–133, 382/158, 224; 356/73

(56) References Cited

U.S. PATENT DOCUMENTS

| 4,965,725 A | * | 10/1990 | Rutenberg ................... 382/224 |
| 5,754,676 A | * | 5/1998 | Komiya et al. ............. 382/132 |
| 5,878,160 A | * | 3/1999 | Horiuchi et al. ............ 382/133 |
| 5,911,002 A | * | 6/1999 | Mitsuyama et al. ........ 382/158 |
| 6,118,522 A | * | 9/2000 | Kanai et al. .................. 356/73 |

FOREIGN PATENT DOCUMENTS

| JP | 57-500995 | 6/1982 |
| JP | 58-29872 | 6/1983 |
| JP | 63-94156 | 4/1988 |
| JP | 1-119765 | 5/1989 |
| JP | 3-63775 | 3/1991 |
| JP | 3-131756 | 6/1991 |
| JP | 5-296915 | 11/1993 |
| JP | 7-55688 | 3/1995 |

OTHER PUBLICATIONS

"Foundation of Neuro Computer", Corona–Sha, 1990, pp. 60–65.
"Recognition Engineering", Corona–Sha, 1993, pp. 36–38.

* cited by examiner

Primary Examiner—Bhavesh Mehta
Assistant Examiner—Gregory Desire
(74) Attorney, Agent, or Firm—Mattingly, Stanger & Malur, P.C.

(57) ABSTRACT

Recognizable data storage apparatus stores an image feature parameter of an object and its classification result for those objects for which said classification results are evaluated as having high reliability and recognizable and for which a classification result is outputted by first pattern recognition apparatus, and recognition suspension data storage apparatus stores an image feature parameter for those objects for which said classification results are evaluated as having low reliability and as being suspended from recognition. Pattern recognition method constitution apparatus constructs second pattern recognition apparatus on the basis of the classification result stored in the recognizable data storage apparatus, and re-classification is conducted for those objects recognition of which is to be suspended. A neural network, for example, is used for the second pattern recognition apparatus. Wrong classification of objects due to an individual difference can be reduced and automated pattern recognition having high accuracy without depending on an individual difference can be accomplished.

26 Claims, 17 Drawing Sheets

FIG. 15

SPECIMEN A (NO. OF PARTICLES = 52)

|  | COINCIDENCE RATIO ||
|  | PRIOR ART METHOD | EXAMPLE OF THIS INVENTION |
| --- | --- | --- |
| RED BLOOD CELL | 75.7 | 89.7 |
| WHITE BLOOD CELL | 80.0 | 80.0 |
| SQUAMOUS EPITHELIAL CELL | 100.0 | 100.0 |
| HYALINE CAST | 100.0 | 100.0 |
| BACTERIA | 100.0 | 100.0 |
| OTHERS | 77.8 | 78.4 |
| THE WHOLE | 76.9 | 86.5 |

FIG. 16

SPECIMEN B (NO. OF PARTICLES = 143)

|  | COINCIDENCE RATIO | |
| --- | --- | --- |
|  | PRIOR ART METHOD | EXAMPLE OF THIS INVENTION |
| RED BLOOD CELL | 100.0 | 100.0 |
| WHITE BLOOD CELL | 78.9 | 97.2 |
| SQUAMOUS EPITHELIAL CELL | 100.0 | 100.0 |
| HYALINE CAST | 100.0 | 100.0 |
| BACTERIA | 100.0 | 100.0 |
| OTHERS | 57.6 | 58.8 |
| THE WHOLE | 74.1 | 88.1 |

FIG. 17

ALL SPECIMENS
(NO. OF SPECIMENS = 903, NO. OF PARTICLES = 40,434)

|  | COINCIDENCE RATIO | |
|---|---|---|
|  | PRIOR ART METHOD | EXAMPLE OF THIS INVENTION |
| RED BLOOD CELL | 92.8 | 96.1 |
| WHITE BLOOD CELL | 87.9 | 93.4 |
| SQUAMOUS EPITHELIAL CELL | 83.0 | 83.6 |
| HYALINE CAST | 82.9 | 85.9 |
| BACTERIA | 79.8 | 85.0 |
| OTHERS | 89.8 | 90.2 |
| THE WHOLE | 89.0 | 90.6 |

PATTERN RECOGNITION APPARATUS AND PATTERN RECOGNITION METHOD

TECHNICAL FIELD

The present invention relates to a pattern recognition technology utilizing a computer. More particularly, this invention relates to a pattern recognition apparatus and a pattern recognition method which can be applied to a method of, and an apparatus for, executing pattern recognition suitable for an automated urinary sediment examination system for classifying particles in urine, and which can accurately classify objects having great individual differences without being affected by the individual differences.

BACKGROUND ART

A urinary sediment examination is the one that examines solid components such as blood cells, tissue cells, etc., contained in urine and reports the kinds and amounts of the components. It has been customary for a laboratory expert to first centrifuge a predetermined amount of urine, then to dye the resulting sediment components, to sample them on a preparation and to microscopically observe the components. Each component is classified in accordance with its features such as the shape, dyeability, and so forth. A method of imaging the solid components in urine as a still image is described as a technology for automatically executing the urinary sediment examination in, for example, JP-A-57-500995, JP-A63-94156 and JP-A-5-296915. These technologies involve the steps of passing a sample through a flow passage (flow cell) having a specific shape, causing particles in the sample to flow through a broad imaging area, turning on a flash lamp when any solid components are detected in the sample and imaging a magnified image of the solid components in urine as a still image. The sediment components imaged as the still image in this way are automatically classified by separating the region of the sediment components from a background region on the image, determining image feature parameters in the sediment component region and classifying the sediment components on the basis of these feature parameters. An area, a perimeter, a mean color density, etc., are used as the image feature parameters. JP-A-1-119765, for example, describes a region dividing method of a blood cell image as one of the technologies of separating the region of the solid components from the background region on the image. This reference segments the region of the image in a color space by using a threshold value determined from a density histogram. JP-B-58-29872 and JP-A-3-131756, for example, describe the classification of the blood cell images as a technology of classifying objects from the image feature parameters. JP-B-58-29872 employs a discrimination logic or dicision tree constituted by statistical discriminating functions in multiple stages on the basis of the image feature parameters. JP-A-3-131756 employs a hierarchical network as a recognition logic.

DISCLOSURE OF INVENTION

The individual difference of each specimen is great in the urinary sediment examination and even those objects which ought to be classified into the same class exhibit great differences in the shape and dyeability from specimen to specimen. Therefore, the individual difference renders a great problem for automatic classification. For instance, the size and the shape of the blood cells in urine vary with pH of urine, its specific gravity and osmotic pressure. Because the white blood cell is generally greater in size than the read blood cell, it is rare that they are wrongly classified. However, there may be the case where the white blood cell of a specimen shrinks depending on the condition such as the pH, the specific gravity, the osmotic pressure, etc., and is wrongly classified as the red blood cell. When this classification is done with eye, all the specimens are first checked as a whole so as to sort out typical those objects which can be judged reliably as the white blood cell and then to judge the overall tendency of the specimens that the white blood cells are rather small as a whole, or that there are a large number of white blood cells which are deformed, for example. Thereafter, the objects which cannot be classified easily are tackled. Even though the white blood cells are so small that they are likely to be mistaken as the red blood cells, for example, they are classified as the white blood cells if the typical blood cells of the specimen are small as a whole and if the red blood cells do not appear. Therefore, the conventional pattern recognition method which decides the classification class to which a given pattern belongs from only the given pattern cannot eliminate the influences of the individual difference for each specimen, and is not free from the problem that classification accuracy drops for those specimens in which rather small white blood cells peculiarly appear. It is an object of the present invention to provide pattern recognition which reduces wrong classification of objects resulting from the individual difference in pattern recognition of those objects which exhibit different features depending on the individuals (samples) even though the objects ought to be classified into the same class.

The first construction of a pattern recognition apparatus according to the present invention comprises first pattern recognition means for inputting a set of input samples constituted by a plurality of input patterns, classifying each input pattern in the set of input samples into a classification class to which this input pattern belongs, evaluating reliability of this classification result and outputting the classification class to which this input pattern belongs, as being recognizable, for the input pattern for which a classification result having high reliability can be obtained; first storage means for storing those input patterns among the set of input samples which are evaluated as having low reliability of the classification result obtained by the first pattern recognition means and for which recognition is suspended; second storage means for storing those input patterns among the set of input samples which are evaluated as having high reliability of the classification result obtained by the first pattern recognition means and which are judged as recognizable, and for storing the classification class, to which the input patterns belong, outputted by the first pattern recognition means; second pattern recognition means being constructed by using the input pattern stored in the second memory means and the classification class to which the input pattern belongs as a training sample, for inputting the input pattern stored in the first storage means and outputting the classification class to which the input pattern belongs; and pattern recognition method construction means for constructing the second pattern recognition means by using the input pattern stored in the second storage means and the classification class to which this input pattern belongs, as a training sample.

In the first construction described above, the second construction of the pattern recognition apparatus according to the present invention includes reference pattern recognition method storage means, and wherein the second pattern recognition means is initialized by using the content of the reference pattern recognition method storage means before the pattern recognition method construction means constructs the second pattern recognition method.

The third construction of the pattern recognition apparatus according to the present invention comprises pattern recognition means being set to the initial state before one set of input samples comprising a plurality of input patterns are inputted, for classifying each input pattern in the set of input samples to a classification class to which each input pattern belongs, evaluating reliability of this classification result and outputting a classification class to which the input pattern belongs, as being recognizable, for those input patterns for which a classification result having high reliability is obtained; first storage means for storing the input patterns in the set of samples for which the classification result is evaluated as having low reliability and for which recognition is suspended by the pattern recognition means; second storage means for storing those recognizable input patterns in the set of samples which are evaluated as having high reliability of the classification result obtained from the pattern recognition means and for storing the classification class, to which the input pattern belongs, outputted from the pattern recognition means; pattern recognition method adjustment means for optimizing the pattern recognition means by using the input pattern and the classification class to which the input pattern belongs, stored in the second storage means, as a training sample; and reference pattern recognition method storage means for storing the initial state of the pattern recognition means; wherein the input pattern stored in the first storage means is inputted to the pattern recognition means after the pattern recognition means is optimized by the pattern recognition method adjustment means, and the classification class to which the input pattern belongs is outputted.

The fourth construction of the pattern recognition apparatus according to the present invention comprises input pattern storage means for storing one set of input samples comprising a plurality of input patterns; a neural network for executing pattern recognition; reliability evaluation means for evaluating reliability of a pattern recognition result for the pattern inputted by the output value of the neural network; initial weight value storage means for storing the number of layers of the neural network in the initial state, the number of neurons in each layer and weight value between the neurons; neural network training means for training the neural network; and pattern recognition result storage means; wherein a plurality of patterns constituting one set of input samples are stored in the pattern storage means, and after the neural network is initialized in accordance with the content of the initial weight value storage means, the following processes (1) to (4) are executed for all the input patterns stored in the pattern storage means and are repeated until reliability of the pattern recognition by the neural network for all the patterns is evaluated as high, or until a predetermined number of times is reached, and then the pattern recognition result stored in the pattern recognition result storage means is outputted:

(1) A process for executing pattern recognition by inputting one by one the patterns stored in the pattern storage means to the neural network;
(2) A process for storing the recognition result in the pattern recognition result storage means;
(3) A process for evaluating reliability of the pattern recognition result for the input pattern by the reliability evaluation means by using the output value of the neural network; and
(4) A process for executing training of the neural network by the neural network training means by using the recognition result for those input patterns which are evaluated as having high reliability.

The fifth construction of the pattern recognition apparatus according to the present invention comprises pattern recognition means for inputting one set of input samples comprising a plurality of input patterns, classifying each input pattern in the set of input samples to a classification class to which the input pattern belongs, evaluating reliability of the classification result, outputting the classification class to which the input pattern belongs, as being recognizable for those of the input patterns for which the classification result having high reliability can be obtained, suspending recognition for those of input patterns which have low reliability of the classification result, and outputting a first applicant and a second applicant of the classification class to which the input pattern is to be classified; storage means for storing the first and second applicants of the classification class to which those input patterns in the set of samples which are evaluated as having low reliability of the classification result obtained from the pattern recognition means and for which recognition is suspended are to be classified; a counter for counting, for each classification class, the number of those objects which are evaluated as having high reliability of the classification result and as being recognizable, from the pattern recognition means, and for which the classification class is outputted; and reasoning means for deciding the classification class of the input pattern by using the content of the counter and the first and second applicants of the classification class for those input patterns which are evaluated as having low reliability of the classification result, which are stored in the storage means and for which recognition is suspended.

In a pattern recognition apparatus for urinary sediment examination, for example, the present invention first classifies only those objects which provide a classification result having high reliability for each urine sample, then builds afresh a pattern recognition logic reflecting the tendency of the objects in the sample such as the tendency that the number of white blood cells which are rather small in size is large as a whole, and classifies those objects for which the classification result having high reliability cannot be obtained, by using this recognition logic. To build the pattern recognition logic reflecting the tendency of the objects, pattern recognition is first made once, reliability of the recognition result so obtained is evaluated, and the pattern recognition logic is built once again by using the objects having high reliability of the recognition result and their classification result as the training sample. The present invention re-builds the recognition logic by using those objects which can be accurately classified by the apparatus, and can automatically optimize the recognition logic without human judgement.

In the case of the urinary sediment examination, in particular, the object of all the classification items seldom appear in one specimen, and a rule that the objects of specific classification items appear depending on the kind of diseases and troubles is generally determined. When a certain object which cannot be classified easily into which of the red blood cell or the white blood cell appears, which of other objects appear is first examined, and when a large number of typical white blood cells are observed but no red blood cell at all can be observed, the object has a high possibility of the white blood cell. It is known empirically that there is a statistical correlation among the number of appearances of various kinds of objects. When a cast appears, for example, the possibility of the trouble of a renal tubule is high and the possibility of appearance of the renal tubular epithelial cell is high in the sediment. Therefore, when the object for which it is difficult to judge whether the renal tubular epithelial cell or the white blood cell appears, there is a rule to judge that the object has a high possibility of the renal tubular epithelial cell unless the cast appears separately and the typical white blood cell exists. When re-classification is conducted by such a rule for those objects for which the recognition result having high reliability cannot be obtained by pattern recognition, classification accuracy can be improved.

BRIEF DESCRIPTION OF DRAWINGS

FIGS. 15, 16 and 17 are tables showing comparison results of a coincidence ratio between the classification result by the fourth embodiment and the classification result by human eye, and a coincidence ratio between a conventional automatic classification result using only the neural network and the classification result by human eye.

BEST MODE FOR CARRYING OUT THE INVENTION

Figure 4:
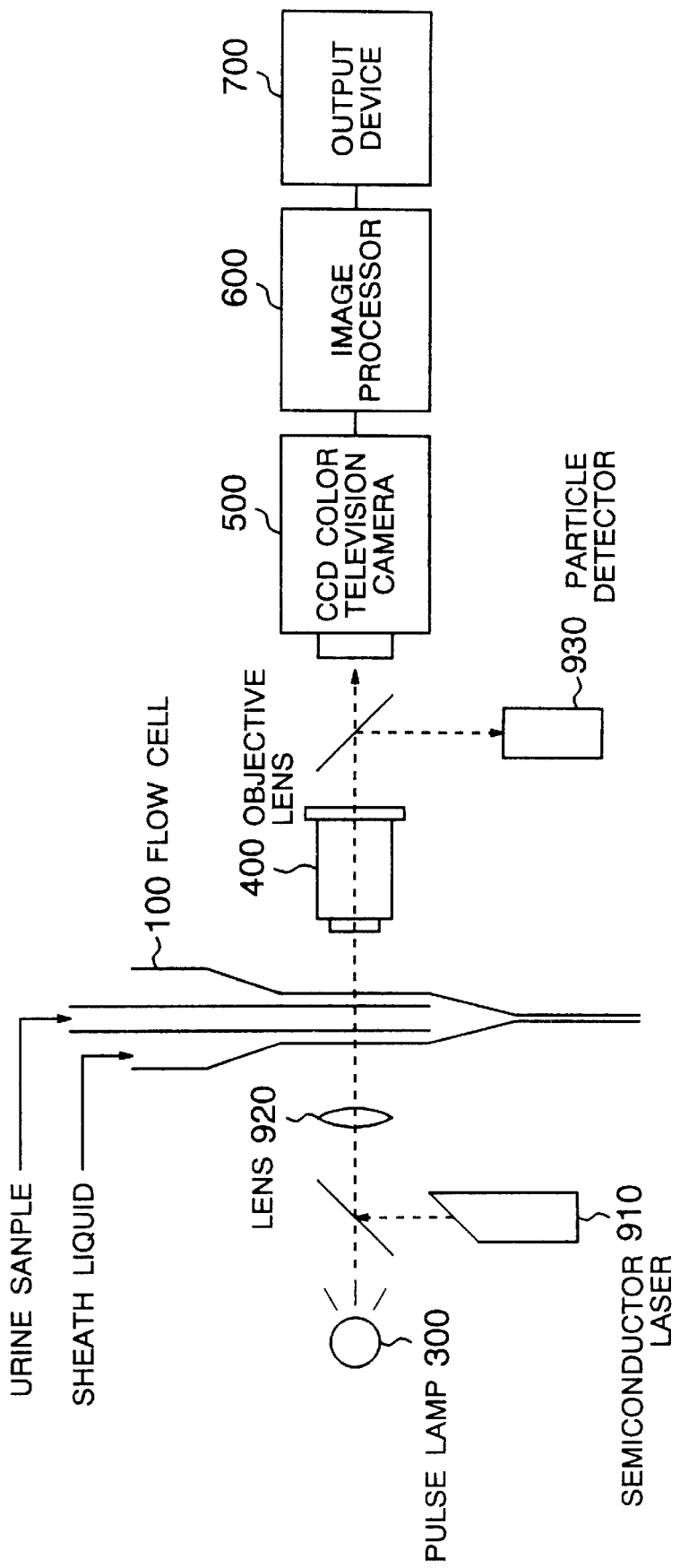
FIG. 4 is a diagram showing the construction of an automated urinary sediment examination system using the present invention.
Figure 5:
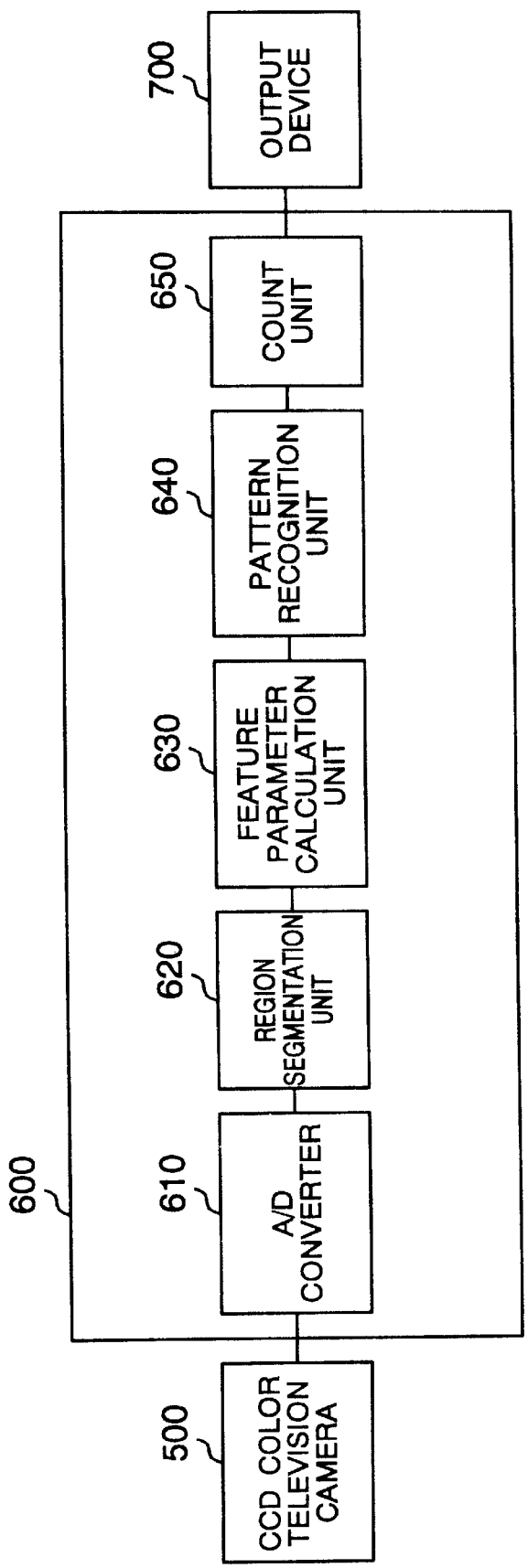
FIG. 5 is a diagram showing the construction of an image processor of the automated urinary sediment examination system using the present invention.

The present invention will be explained in detail with reference to the accompanying drawings. Hereinafter, the embodiments in which the present invention is applied to an automated urinary sediment examination system will be explained in detail. FIG. 4 shows an image inputting system and an image processing system of the automated urinary sediment examination system to which the present invention is applied. This system forms a flat flow of a urine sample, which flow is wide and thin, between a CCD color television camera 500 and a pulse lamp 300 by using a flow cell 100. Laser beams are irradiated from a semiconductor laser 910 to the flow of the urine sample formed by the flow cell 100 through a lens 920, a particle detector 930 detects the passage of solid components and the pulse lump 300 is irradiated in synchronism with a detection signal. Irradiation by the pulse lamp 300 is effected instantaneously and the image of the solid contents in urine, which is magnified by an objective lens 400, can be taken as a still image by the CCD color television camera 500. The image so obtained is transferred to an image processor 600. The solid components existing in the image are classified, and the particles of each kind of the sediment components contained in one specimen are counted. The count result is reported to an operator through an output device 700. A printer is used for the output device 700. FIG. 5 shows a detailed construction of the image processor 600. Analog image signals inputted from the CCD color television camera 500 are converted to digital data by an A/D converter 610 and are sent to a region segmentation unit 620. The region segmentation unit 620 segments the image to the background region and an object region containing the sediment components. A feature parameter calculating unit 630 calculates the feature parameters of the object region segmented by the region segmentation unit 620. When a plurality of object regions exist in the image, the feature parameters are calculated for each object region. The area of the object region, its perimeter, color intensity, etc., are used as the feature parameters, for example. The feature parameters of each object region determined by the feature parameter calculating unit 630 are inputted to a pattern recognition unit 640. The pattern recognition unit 640 recognizes which component the object is and classifies the object on the basis of the feature parameters. A counting unit 650 has the same number of counters as the number of classes to be classified and increments the counter value corresponding to the classified items whenever the object is classified by the pattern recognition unit 640. When measurement for one specimen is complete, the content of the counters is converted to the number of pieces in unit volume and is transferred to, and outputted by, the output device 700. The value of each counter is reset to 0 whenever measurement of one specimen is complete. The pattern recognition unit 640 uses a pattern recognition apparatus according to the present invention. Hereinafter, the construction of the pattern recognition unit 640 will be explained in detail.

First Embodiment

Figure 1:
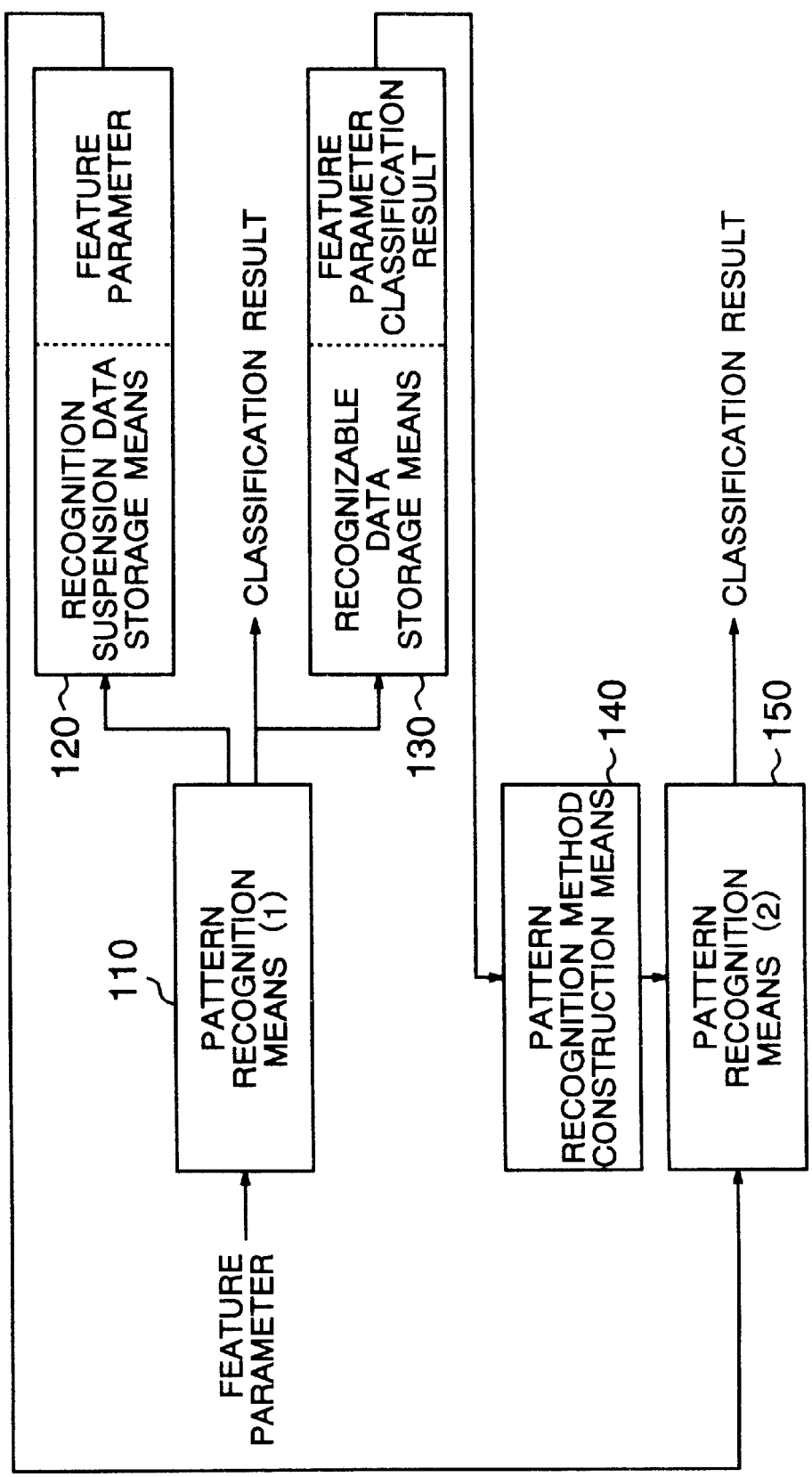
FIG. 1 is a diagram showing the construction of the first embodiment of the present invention.
Figure 6:
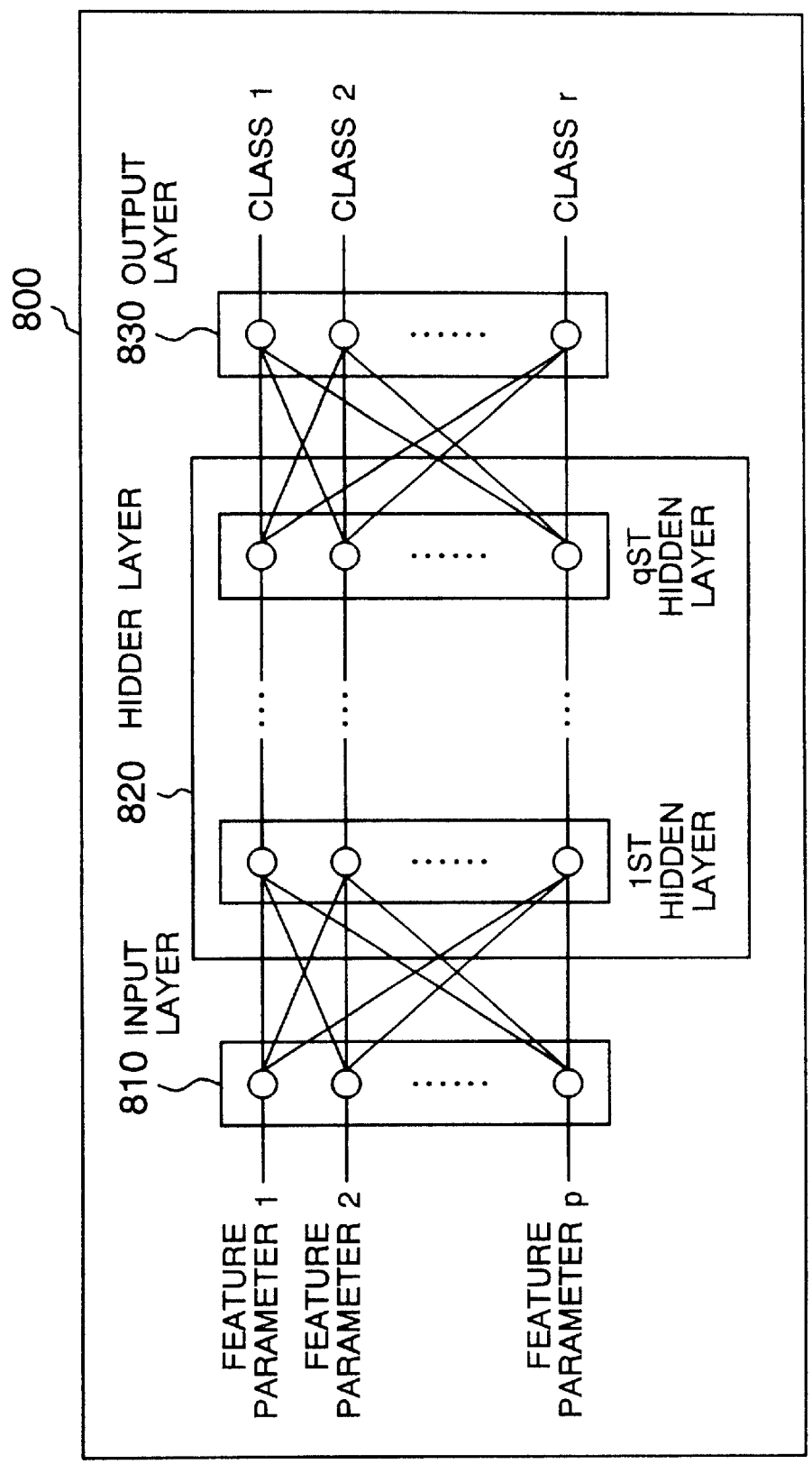
FIG. 6 is a diagram showing the construction of a neural network used in the embodiment of the present invention.
Figure 7:
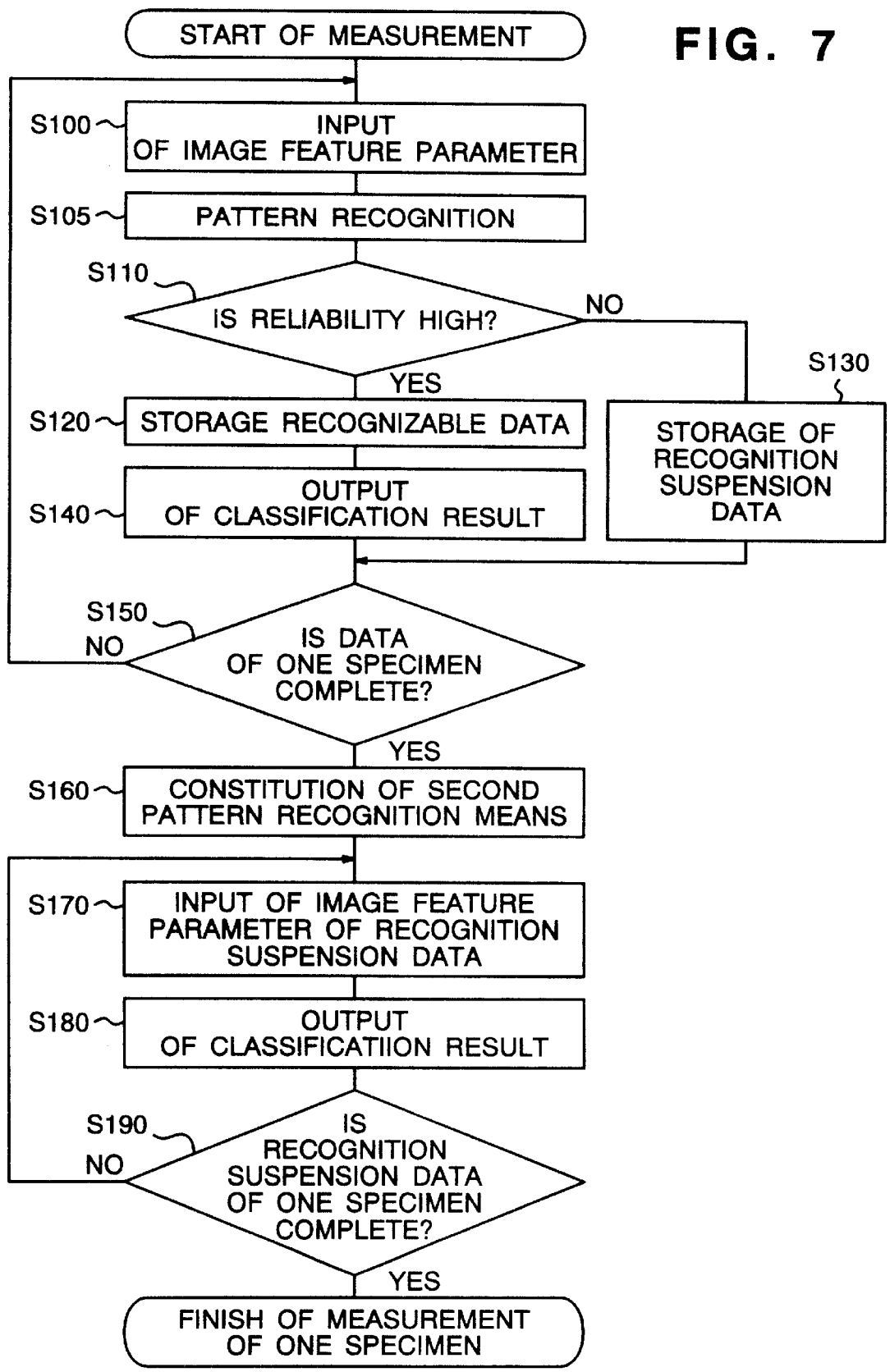
FIG. 7 is a flowchart showing a process flow of the first embodiment of the present invention.

FIG. 1 shows the construction of the pattern recognition unit 640 according to the first embodiment and FIG. 7 shows a process flow in this pattern recognition unit 640. The image feature parameters determined by the feature parameter calculating unit 630 are inputted to first pattern recognition means 110 (Step S100), and pattern recognition is effected for the object image by using the feature parameters of the object image (Step S105). After reliability of the recognition result obtained is evaluated in Step S110, the classification class to which the object belongs is outputted when reliability is judged as being high. A neural network 800 shown in FIG. 6, for example, is used for the first pattern recognition means. The neural network 800 comprises an input layer 810, an output layer 830 and a plurality of hidden layers 820. FIG. 6 shows the construction of a neural network which has q hidden layers and effects classification to r classes by using p feature parameters. The input layer 810 has the same number of neurons as the feature parameters, and a specific feature parameter is inputted to each neuron. The output layer 830 has the same number of neurons as the number of classes to be classified, and each neuron corresponds to a specific class. In the case of the automated urinary sediment examination system, the red blood cell, the white blood cell, the epithelial cell, etc., for example, are used for the classes. The hidden layer 820 comprises one or a plurality of layers, and each layer has a plurality of neurons. The input layer 810 outputs the inputted value to each neuron of the first layer of the hidden layer 820. The neuron of each hidden layer 820 and the neuron of the output layer 830 output the value, which is calculated by a sigmoid function, which is a bounded monotone increasing function, by using the weighted sum of the output of the neurons of the preceding layer as the input". The calculation conducted by each neuron of the hidden layer 820 and the output layer 830 is expressed by the formula (1):

$$Z = f(\Sigma w_i x_i - \theta) \quad (1)$$

In the formula (1), $\Sigma$ is conducted for i=1 to n, z is the output value to the next layer, $x_i$ is the output value of the i-th neuron of the preceding layer, $w_i$ is the weight value, n is the number of neurons of the preceding layer, $\theta$ is the threshold value and f is the sigmoid function. An example of the sigmoid function is shown by the formula (2):

$$F(x) = 1/\{1 - \exp(-x)\} \quad (2)$$

The neural network 800 used for the first pattern recognition means 110 is in advance trained by using a training sample. When this training is made, as many feature parameters of the image belonging to each class as possible are prepared, and training is executed so that when the feature parameters of a certain image are inputted, the output of the neuron of the output layer 830 corresponding to the class to which this image belongs becomes "1" and the output of other neurons of the output layer 830 becomes "0". For example, the feature parameters 1 to p calculated from the image belonging to the class 1 are inputted to the neurons of the corresponding input layer 810, the desired output which sets the output of the neurons corresponding to the class 1 of the output layer 830 to "1" and the output of the neurons corresponding to the classes 2 to r to "0" is given, and training is conducted so that the difference between the desired output and the practical output value becomes small. A back-propagation method (e.g. "Foundation of Neuro Computer", Corona-Sha, pp. 60–65(1990)) can be used for the training method of the neural network. To classify unknown samples by using this neural network, the feature parameters of a certain object image are inputted to each of the corresponding input neurons of the input layer 810, and the classification class corresponding to the output neuron that outputs the maximum value among the output neurons of the output layer 830 is outputted as the classification result. At this time, when the feature parameters of the inputted object image are approximate to those of the image used as the training sample, the maximum output value is approximate to 1 while the output value of other output neurons is approximate to 0. When the inputted image is greatly different from the image used for the training sample, however, the maximum output value is approximate to 0, or the output value which is the second greatest may assume a value approximate to 1, too, even when the maximum output value is approximate to 1. When an object having intermediate features between two kinds of classes appears, two output neurons corresponding to these two kinds of classes output values of a similar extent. For example, when rather small white blood cells which are likely to be mistaken as the red blood cells or rather large red blood cells which are likely to be mistaken as the white blood cells appear and when their image feature parameters are inputted, the output neuron corresponding to the red blood cell and the output neuron corresponding to the white blood cell output values (e.g. 0.3) approximate to each other. When the maximum output value is approximate to 1 while other output values are approximate to 0, reliability of the recognition result of the inputted object image can be judged as high and reliability can be judged as low at other times. When the maximum output value is assumed to be a1 and the second greatest output value, a2, for example, a threshold value t1 is set to the maximum output value a1 and a threshold value t2 is set to the difference (a1−a2) between the maximum output value and the second greatest output value. When a1>t1 and (a1−a2)>t2, reliability of the recognition result of the inputted object image is high. Therefore, the recognition result is judged as recognizable and the classification class corresponding to the output neuron that outputs the maximum value is outputted as the classification result. On the other hand, reliability of the recognition result is judged as low at other times and recognition is suspended.

As to those objects reliability of the recognition result of which is high and the classification result is outputted as being recognizable by the first pattern recognition means 110, the image feature parameters of such objects and the classification result are stored in the recognizable data storage means 130 (Step S120) and the classification result is outputted (Step S140). As to those objects reliability of the recognition result of which is low and which are judged as being to be suspended, the image feature parameters of such objects are stored in the recognition suspension data storage means 120 (Step S130). Whether or not classification by the first pattern recognition means 110 is executed for all the objects of one specimen is judged at Step S150, and the processes from Step S100 on are repeated when any remaining objects exist. When the process is complete for all the objects of one specimen, the process shifts to Step S160. The second pattern recognition means 150 is constructed by the pattern recognition method construction means 140 at Step S160. A neural network, for example, is used for the second pattern recognition means 150. The structure of the neural network used at this time need not always be the same as the structure of the neural network used as the first pattern recognition means 110. When the neural network is used for the second pattern recognition means 150, the back-propagation algorithm described already is used as the pattern recognition method constitution means 140. The image feature parameters and the classification result stored in the recognizable data storage means are used as the training sample at this time.

Figure 14:
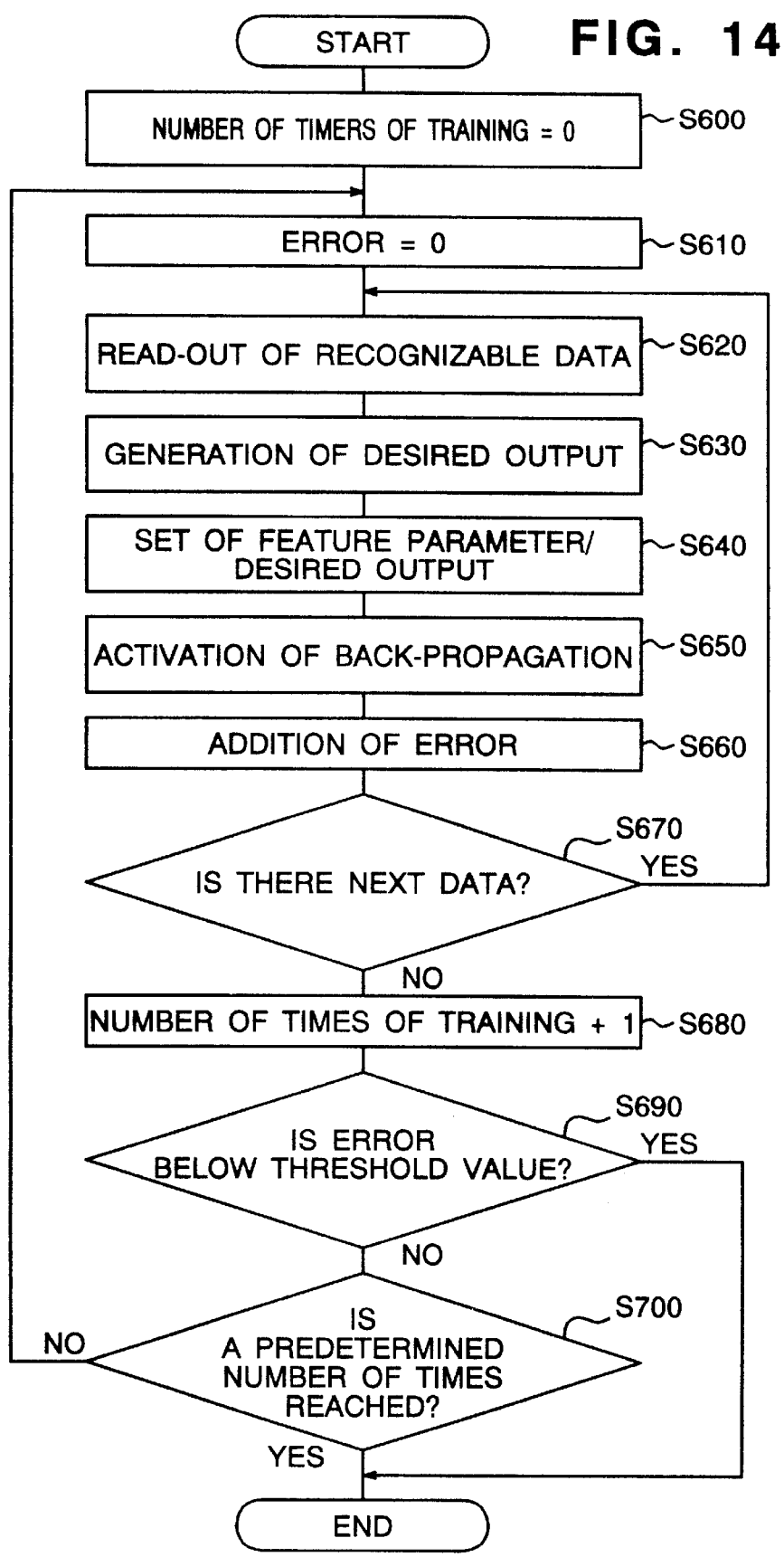
FIG. 14 is a flowchart showing an example of a process flow of pattern recognition method construction means using a neural network in the present invention.

FIG. 14 shows an example of the process flow of the pattern recognition method constitution means 140 when the neural network is used as the second pattern recognition means 150. The count value of the number of times of training and the cumulative value of the errors are set to 0 in Steps S600 and S610, respectively. One set of the image feature parameters and the classification result stored in the recognizable data storage means 130 are read out in the next Step S620 and the desired output is generated from the recognition result so read out (Step 630). More concretely, the desired output which sets "1" to the output neuron corresponding to the classification class obtained as a result of recognition and "0" to other neurons is generated. In Step S640, the feature parameter read out in Step S620 is set to the input neuron of the neural network used as the second pattern recognition means 150 while the desired output generated in Step S630 is set to the output neuron. Training is then executed in Step S650 by using the back-propagation algorithm so that the difference between the output value of the neural network and the desired output becomes small, and the weight value between the neurons is changed. At this time, the square sum of the difference between the practical output value of each output neuron and the desired output is calculated and is added to the cumulative value of the errors (Step S660) even if the maximum output value is smaller than "1" (e.g. 0.8). When pattern recognition of the object is executed by the neural network as the first recognition means 110 in Step S105 shown in FIG. 7, training is made by giving the desired output so that the maximum output value becomes "1" at the time of training in Step S650 and the weight values between the neurons of the neural network can be optimized in such a manner as to eliminate the influences of the individual difference of the specimen. Whether or not the recognizable data which is not yet used for training exists is judged in Step S670, and if it does, the processes from Step S620 on are repeated for the remaining data. When a series of processes from Step S620 to Step S660 are complete for all the recognizable data, the number of times of training is counted once in Step S680. The cumulative value of the square error is averaged by the number of data used for training and is then compared with the threshold value in Step S690. When the mean square error is smaller than the threshold value set in advance, the training process is complete and when the former is greater than the latter, whether or not the number of times of training reaches a predetermined number of times is judged in Step S700. When the number of times of training reaches a predetermined number of times in Step S700, the training process is complete. When it does not reach the predetermined number, the processes from Step S610 on are repeated.

After the second pattern recognition means 150 is constructed by the pattern recognition method construction means 140 in Step S160 in FIG. 7, classification is executed by inputting the image feature parameters stored in the recognition suspension data storage means 120 to the second pattern recognition means 150 (Step S170). When the neural network is used for the second pattern recognition means 150, the image feature parameter of the classification object is inputted to each neuron of the input layer and after the output value of each output neuron is calculated, the classification class corresponding to the output neuron that outputs the maximum value is outputted as the classification result of the object (Step S180). Whether or not the processes from Step S170 on are executed for all the data of one specimen stored in the recognition suspension data storage means 120 is judged in Step S190, and the process of the specimen is complete if the remaining data does not exist. If the remaining data exists, the processes from Step S170 on are repeated. After the processes for one specimen are complete, the processes from Step S100 on are repeated for another specimen.

Second Embodiment

Figure 2:
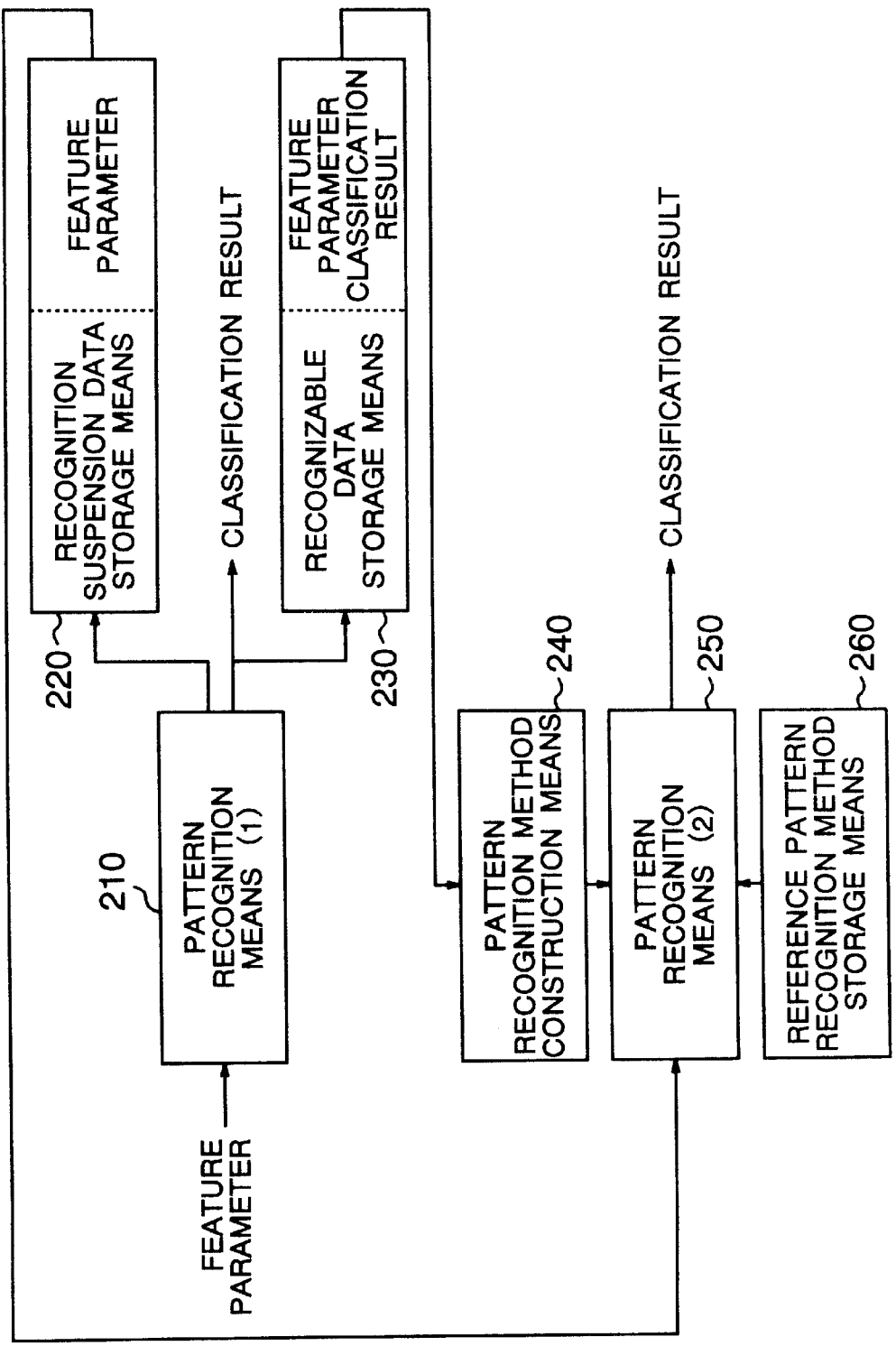
FIG. 2 is a diagram showing the construction of the second embodiment of the present invention.
Figure 3:
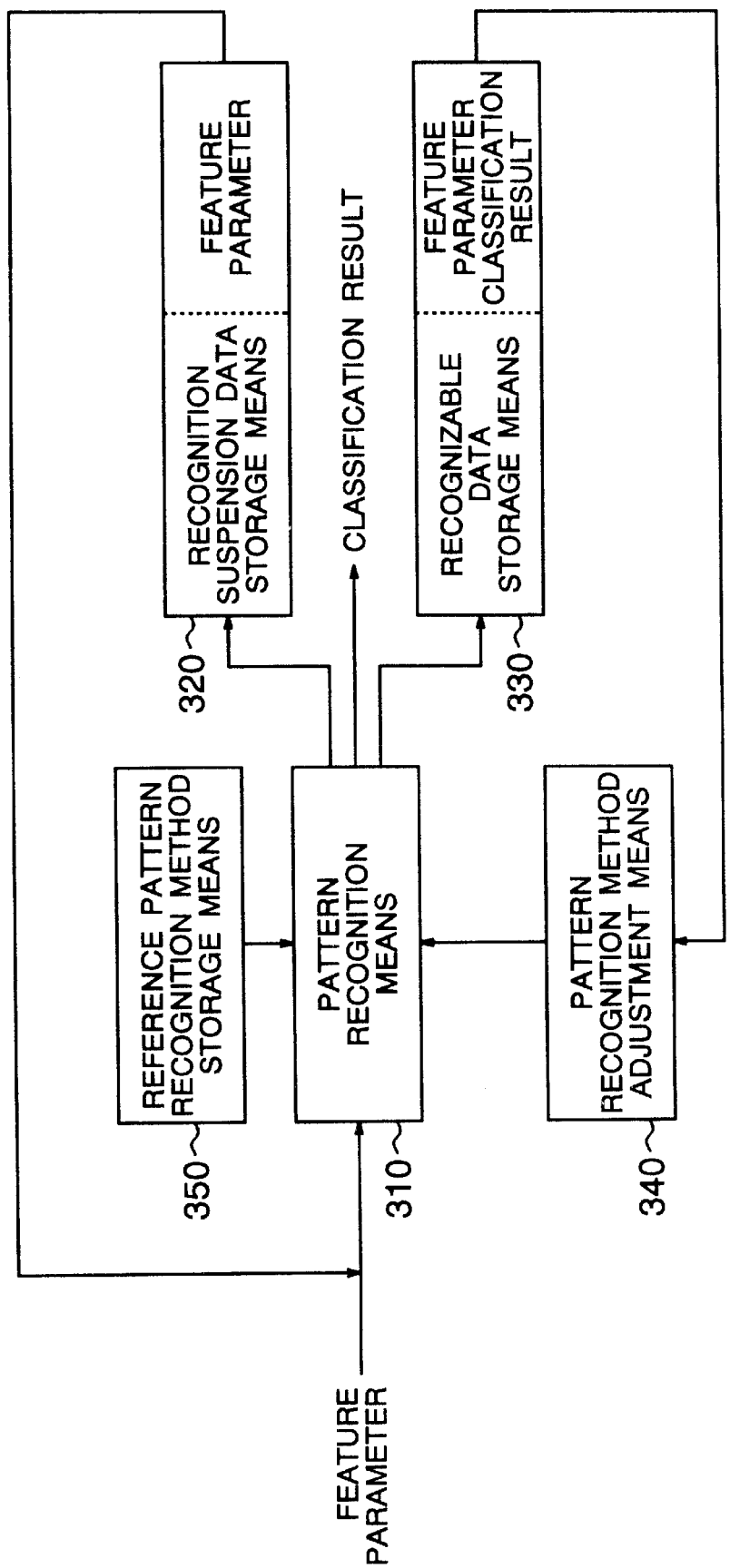
FIG. 3 is a diagram showing the construction of the third embodiment of the present invention.
Figure 8:
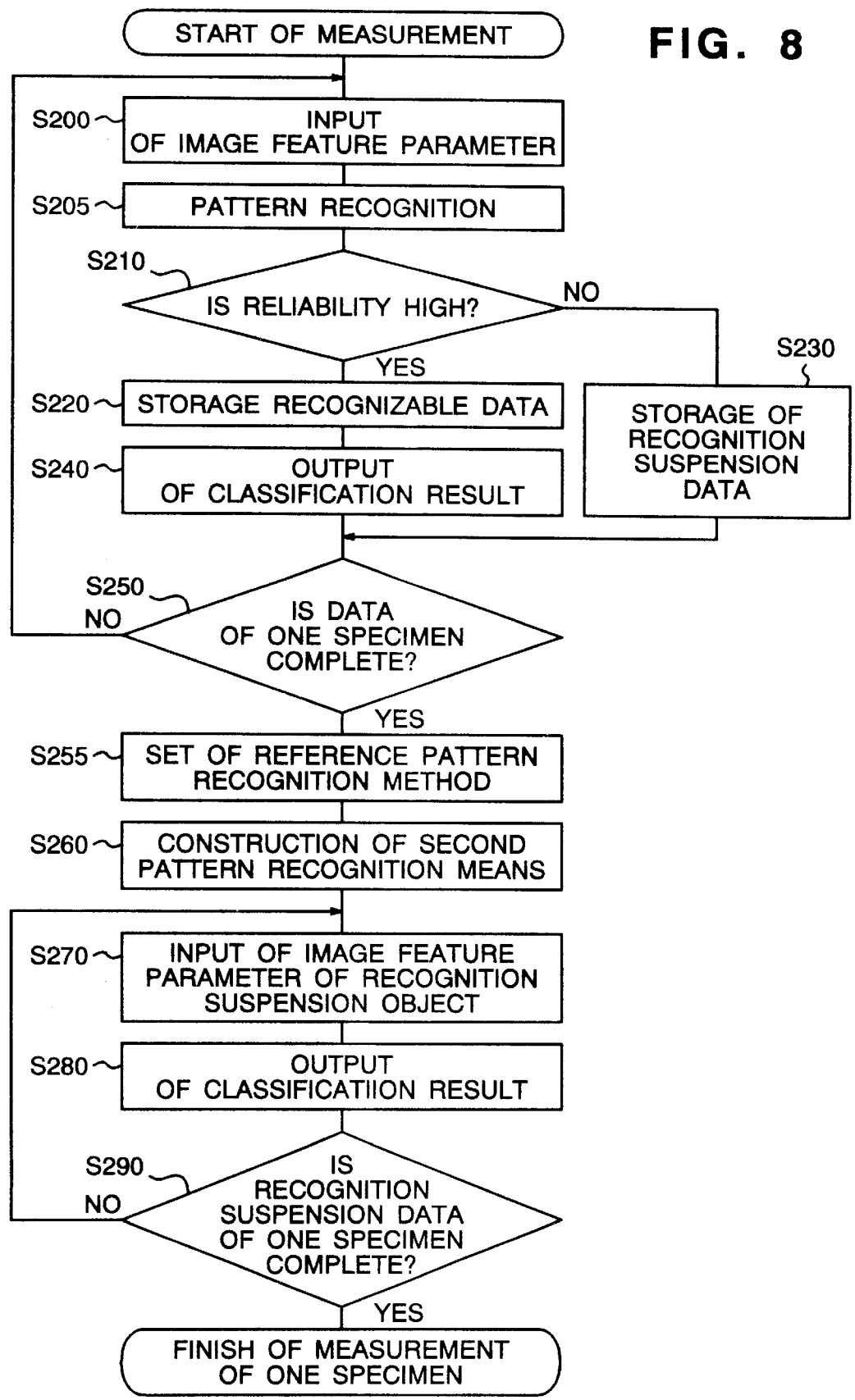
FIG. 8 is a flowchart showing a process flow of the second embodiment of the present invention.

FIG. 2 shows the construction of the pattern recognition unit 640 in FIG. 5 according to the second embodiment and FIG. 8 shows its process flow. The first pattern recognition means 210, the recognition suspension data storage means 220 and the recognizable data storage means 230 operate in exactly the same way as the first pattern recognition means 110, the recognition suspension data storage means 120 and the recognizable data storage means 130 in the first embodiment shown in FIG. 1, respectively. In other words, the feature parameter of the object image is inputted to the first pattern recognition means (Step S200) to execute pattern recognition (Step S205) and reliability of the resulting recognition result is evaluated (Step S210). When reliability is judged as high, the image feature parameter of the object is stored in the recognizable data storage means 230 by regarding the pattern as recognizable (Step S220) and the classification result is outputted (Step S240). When reliability is judged as low, the image feature parameter is stored in the recognition suspension data storage means 220 by regarding recognition as being to be suspended (Step S230). After classification is executed for the objects of one specimen by the first pattern recognition means 210 (Step S250), the second pattern recognition means 250 is initialized by using the storage content of the reference pattern recognition method storage means 260 (Step S255). When the neural network is used for the second pattern recognition means 250, for example, the data describing the structure of the neural network, for which training is made by using the standard training sample, such as the number of layers of the neural network, the number of neurons of each layer, the weight value between the neurons, etc., is stored in advance in the reference pattern recognition method storage means 260, and the second pattern recognition means 250 is set to the initial state as the reference in accordance with this data. When the neural network is used for the second pattern recognition means 250, the pattern recognition method construction means 240 conducts training of the second pattern recognition means 250 by using the back-propagation method in the same way as the pattern recognition method constitution means 140 constructs the second pattern recognition means 150 in the first embodiment, the process flow of which is shown in FIG. 14 (Step S260). The second pattern recognition means 250 is initialized in advance to the reference state in accordance with the content of the reference pattern recognition method storage means 260 and in this way, the second embodiment can construct the second pattern recognition means 250 with a smaller number of times of training than in the first embodiment. Steps S270, S280 and S290 execute the same processes as the processes of Steps S170, S180 and S190 in the first embodiment, respectively. After the processes for one specimen are complete, the processes from Step S200 on are repeated for another specimen.

Third Embodiment

Figure 9:
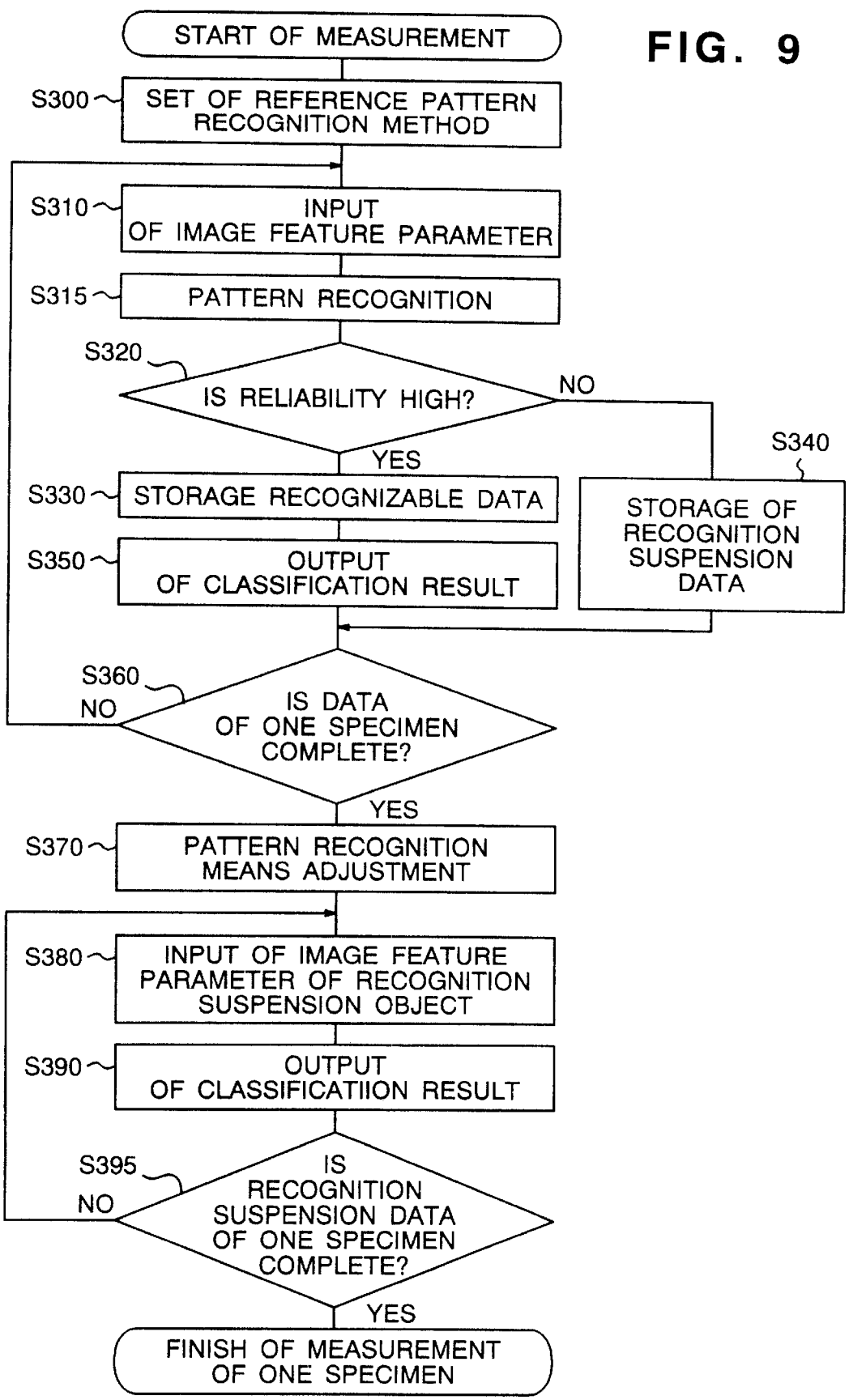
FIG. 9 is a flowchart showing a process flow of the third embodiment of the present invention.

FIG. 5 shows the structure of the pattern recognition unit 640 in FIG. 5 according to the third embodiment and FIG. 9 shows its process flow. In this third embodiment, the pattern recognition means 310 is initialized on the basis of the content stored in the reference pattern recognition method storage means 350 (Step S300). The pattern recognition logic constructed in advance by using the standard training sample is stored in the reference pattern recognition method storage means 350. When the neural network is used for the pattern recognition means 310, for example, training of the neural network is executed beforehand by using a large number of training patterns as already described, and the resulting information such as the number of layers of the neural network, the number of neurons of each layer, the weight value between the neurons, etc., is stored in the reference pattern recognition method storage means 350. The neural network as the pattern recognition means 310 is initialized in accordance with the storage content when the process of one specimen is commenced. The process is started after completion of initialization, the image feature parameter of the object image is inputted to the pattern recognition means 310 (Step S310), pattern recognition is executed (Step S315) and reliability of the resulting recognition result is evaluated in Step S320. When reliability is high and the inputted image is recognizable, the image feature parameter of the object image and the classification result are stored in the recognizable data storage means 330 (Step S330) and the classification result is outputted (Step S350). When reliability is low and recognition is suspended, the image feature parameter of the object image is stored in the recognition suspension data storage means 320 (Step S340). When the neural network is used for the pattern recognition means 310, the same method as the first pattern recognition means 110 in the first embodiment is used to conduct pattern recognition and to evaluate reliability of the recognition result. When this process is complete for one object image, whether or not the process for all the objects of one specimen is completed is judged at Step S360, and if any objects remain, the processes from Step S310 on are again repeated for the remaining objects. When the remaining object does not exist, the process shifts to Step S370 and the content of the pattern recognition method 310 is updated by the pattern recognition method adjustment means 340 by using the image feature parameter and the recognition result stored in the recognizable data storage means 330 as the training data. When the neural network is used for the pattern recognition method 310, training of the neural network is done by using the content of the recognizable data storage means 330 as the training sample in the same way as the pattern recognition method constitution means 140 in the first embodiment shown in the flowchart of FIG. 14.

Next, the image feature parameter stored in the recognition suspension data storage means 320 is inputted to the pattern recognition means 310 (Step S380) and the classification result is outputted (Step S390). Whether or not the processes are complete for all the data of the specimen stored in the recognition suspension data storage means is complete is judged in Step S395 and if any remaining objects exist, the processes from Step S380 on are repeated for the remaining objects. When the processes are complete for all the data, the process for this specimen is complete. This third embodiment executes the separation of the recognizable objects from the recognition suspension objects and re-classification of the recognition suspension objects by using the same pattern recognition means. Therefore, this embodiment can simplify the structure of the apparatus or the structure of the process software and can shorten the process time (training time) required for adjusting the pattern recognition method to re-classify the recognition suspension objects. Although the first to third embodiments have thus been described about the case where the neural network is used as the pattern recognition means by way of example, the pattern recognition means used in the present invention is not particularly limited to the neural network. Any pattern recognition means can be employed for the first pattern recognition means 110 in the first embodiment and the first pattern recognition means 210 in the second embodiment so long as the pattern recognition means can evaluate reliability of the recognition result and can output the classification result when reliability is high, and a pattern recognition method based on the statistical decision theory can be used. The pattern recognition method based on this statistical decision theory can "reject discrimination" (e.g. "Recognition Engineering", Corona-Sha, pp. 36–38(1993)) which does not output the classification result when the decision is extremely uncertain, and can classify those objects which are rejected as the objects having low reliability of the recognition result and those objects which are not rejected and the recognition result of which is outputted, as the objects having high reliability of the recognition result.

Any pattern recognition method can be used for the second pattern recognition means 150 in the first embodiment and for the second pattern recognition means 250 in the second embodiment so long as the pattern recognition method is constructed by using the feature parameter and the recognition result of the objects for which the recognition result having high reliability can be obtained by the first pattern recognition means, and the pattern recognition method based on the statistical decision theory, for example, can be used. When this statistical decision theory is used, a discriminating function using parameters of probability distribution (mean, covariance matrix, etc.) in the feature parameter space of the pattern belonging to each classification class is prepared for each classification class, and the classification class corresponding to the discriminating function that outputs the maximum value when the feature parameter is inputted to each discriminating function is outputted as the classification result. In this case, each of the pattern recognition method construction means 140 in the first embodiment and the pattern recognition method construction means 240 in the second embodiment calculates the sample statistic (sample mean, sample covariance matrix, etc.) of the feature parameter for each class by using the data stored in each recognizable data storage means 130, 230 and changes the discriminating function by using the resulting statistic as the estimation value of the probability distribution parameter. The reference pattern recognition method storage means 260 in the second embodiment stores the probability distribution parameter for each class that is determined beforehand by using a large number of training samples. Similarly, the pattern recognition method based on the statistical decision theory can be used for the pattern recognition means 310 in the third embodiment.

Fourth Embodiment

Figure 10:
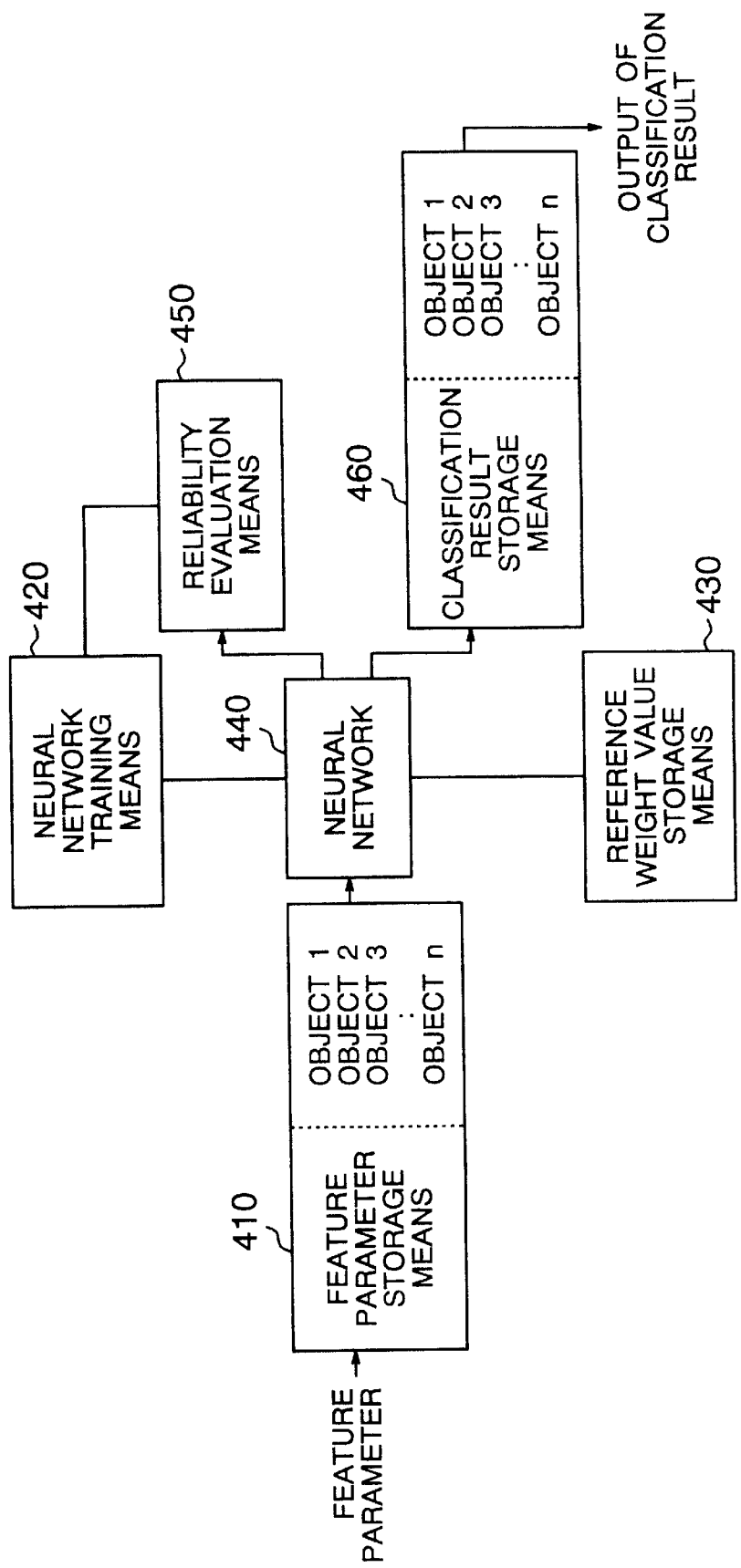
FIG. 10 is a diagram showing the construction of the fourth embodiment of the present invention.
Figure 11:
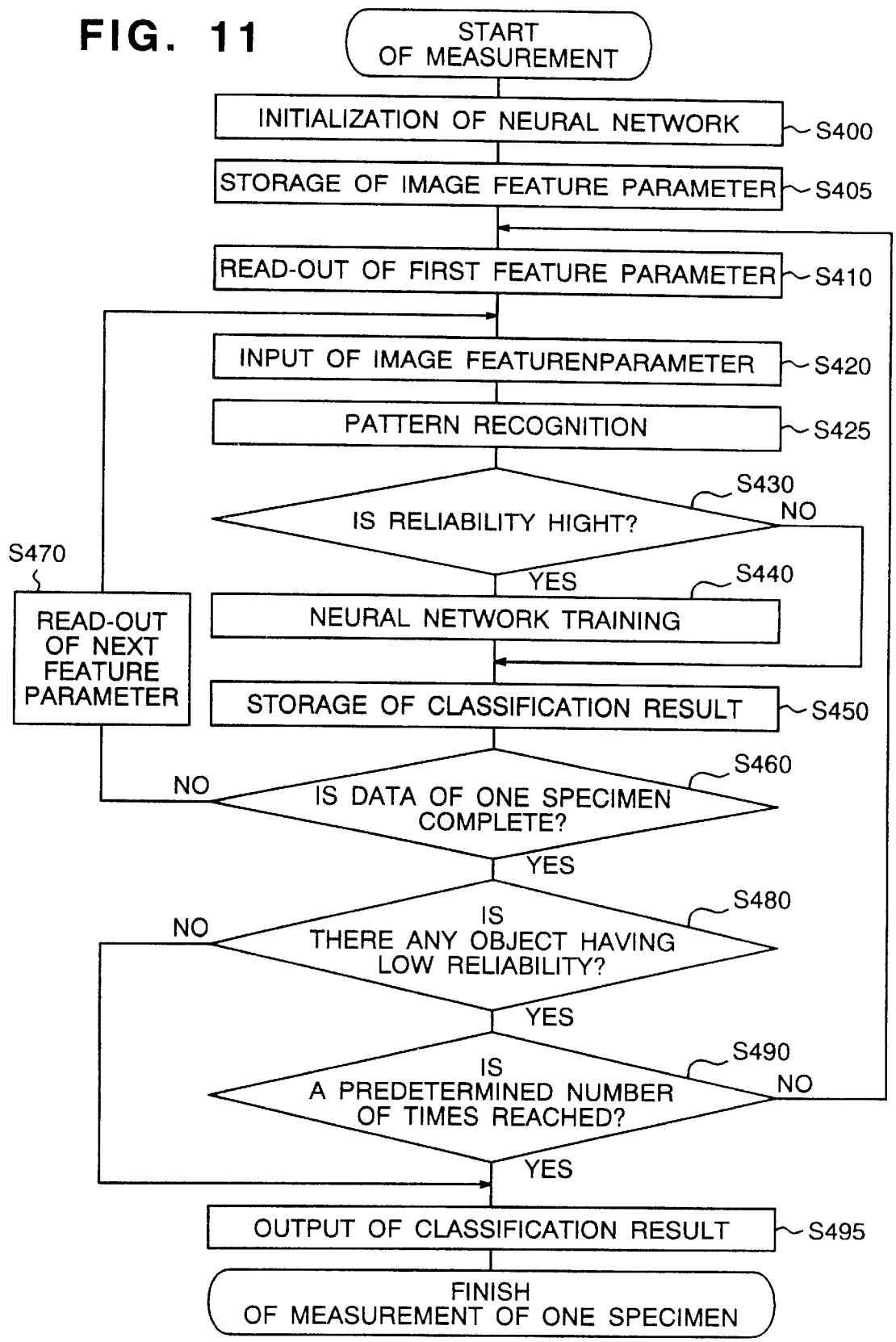
FIG. 11 is a flowchart showing a process flow of the fourth embodiment of the present invention.

When the neural network is used for pattern recognition, the construction described in the fourth embodiment can be employed, too. FIG. 10 is a structural view of the fourth embodiment and FIG. 11 shows its process flow. The neural network is trained in advance by using a large number of training samples, and the number of layers of the neural network, the number of neurons of each layer and the weight value between the neurons obtained as a result of training are stored in the reference weight value storage means 430. In this fourth embodiment, the neural network 440 is initialized in Step S400 by using the number of layers, the number of neurons of each layer and the weight value between the neurons that are stored in the reference weight value storage means 430, and the feature parameters of all the object images for one specimen are stored in the feature parameter storage means 410 in Step S405. Next, the image feature parameter of the first object is read out from the feature parameter storage means 410 (Step S410) and is inputted to the neural network (Step S420). The neural network 440 outputs the classification class corresponding to the output neuron, that outputs the maximum value, as the classification result (Step S425) and inputs further the output value of each output neuron to the reliability evaluation means 450. The reliability evaluation means 450 evaluates reliability of the obtained classification result by using the output value of the neural network 440 (Step S430). Threshold values are set to the maximum output value of the neural network and to the difference between the maximum output value and the second largest output value, respectively, in the same way as Step S110 of the first embodiment shown in FIG. 7 so that reliability of the classification result can be evaluated. When reliability of the recognition result is high, the image feature parameter of the object is inputted, and the desired output is given so that "1" is applied to the output neuron corresponding to the classification result of the object outputted from the neural network 440 and "0", to other output neurons. The neural network training means 420 activates the back-propagation algorithm and executes training for this object (Step S440). Training may be conducted either once or a plurality of times even if the maximum output value is a value smaller than "1" (e.g. 0.8). When pattern recognition of the object is executed by the neural network 440 in Step S425, training is made by giving the desired output so that the maximum output value becomes "1" at the time of training in Step S440. In this way, the weight value between the neurons of the neural network 440 can be optimized in such a manner as to eliminate the influences of the individual difference of the specimen. The back-propagation algorithm must execute forward calculation from the input layer to the output layer and then backward calculation from the output layer to the input layer. However, because this forward calculation has already been made at the time of pattern recognition (Step S425), only the backward calculation needs be carried out and the training time can be shortened. The neural network training means 420 stores the number of times of the activation of the back-propagation algorithm.

Next, the pattern recognition result obtained in Step S425 is stored in the classification result storage means 460 (Step S450). When the classification result of the object has already been stored, the pattern recognition result is overwritten to the previous classification result. When reliability of recognition is judged as low in Step S430, the process shifts to Step S450 without conducting training of the neural network 440 and the classification result is stored in the classification result storage means 460. Next, whether or not the processes from Step S420 on are complete is examined for all the objects of one specimen stored in the feature parameter storage means 410 in Step S460. If any remaining objects exist, the image feature parameter of the next object is read out in Step S470 and the processes from Step S420 on are repeated. When the processes for all the objects are judged as being complete in Step S460, whether or not any objects having low reliability of the recognition result exist in the specimen is judged from the number of times of activation of the back-propagation algorithm stored in the neural network training means 420 (Step S480). If the object having low reliability of the recognition result does not exist, the classification result stored in the classification result storage means 460 is outputted (Step S495) and the processes for this specimen are complete. If any objects having low reliability of the recognition result exist, how may times the processes including training of the neural network 440 from Step S410 on are conducted is examined, and when a predetermined number of times is reached, the process shifts to Step S495, the classification result stored in the classification result storage means 460 is outputted, and the processes for this specimen are complete. When the processes from Step S410 on do not reach a predetermined number of times in Step S490, the processes from S410 on are repeatedly executed. The neural network training means 420 counts the number of times of processing in Step S490. The fourth embodiment executes pattern recognition of typical and non-typical objects by using the same neural network in the same way as in the third embodiment, and has the characteristic feature in that because a process for executing recognition for individual objects and immediately executing training when the object is the typical object is repeated in a loop, the number of those objects which are classified as the typical objects increases when the number of times of this loop increases, and training converges more rapidly.

When the fourth embodiment is applied to an automated urinary sediment examination system, for example, the effect of the present invention can be confirmed by setting a predetermined number of times (maximum number of times of training per specimen) in the Step S490 to about 10 times. When the proportion (coincidence ratio) of the object images for which the classification result with human eye is the same as the automatic classification result by pattern recognition is examined for 40,434 images of 909 specimens, the following result can be obtained. When classification is made by using only the neural network without using the present invention for a certain specimen A comprising 52 object images, the coincidence ratio of the red blood cell is 75.7% as shown in FIG. 15. When the present invention is used, on the other hand, the coincidence ratio is improved to 89.7%. In the case of another specimen B comprising 143 object images, the coincidence ratio of the white blood cell is 78.9% when classification is made by using only the neural network as shown in FIG. 16 but when the present invention is used, the coincidence ratio of the white blood cell is improved to 97.2%. In this way, the coincidence ratio can be improved for other specimens and for other items, and the coincidence ratios of the red blood cell, the white blood cell and bacteria, in particular, are drastically improved as shown in FIG. 17 showing altogether the results for all the specimens.

Fifth Embodiment

Figure 12:
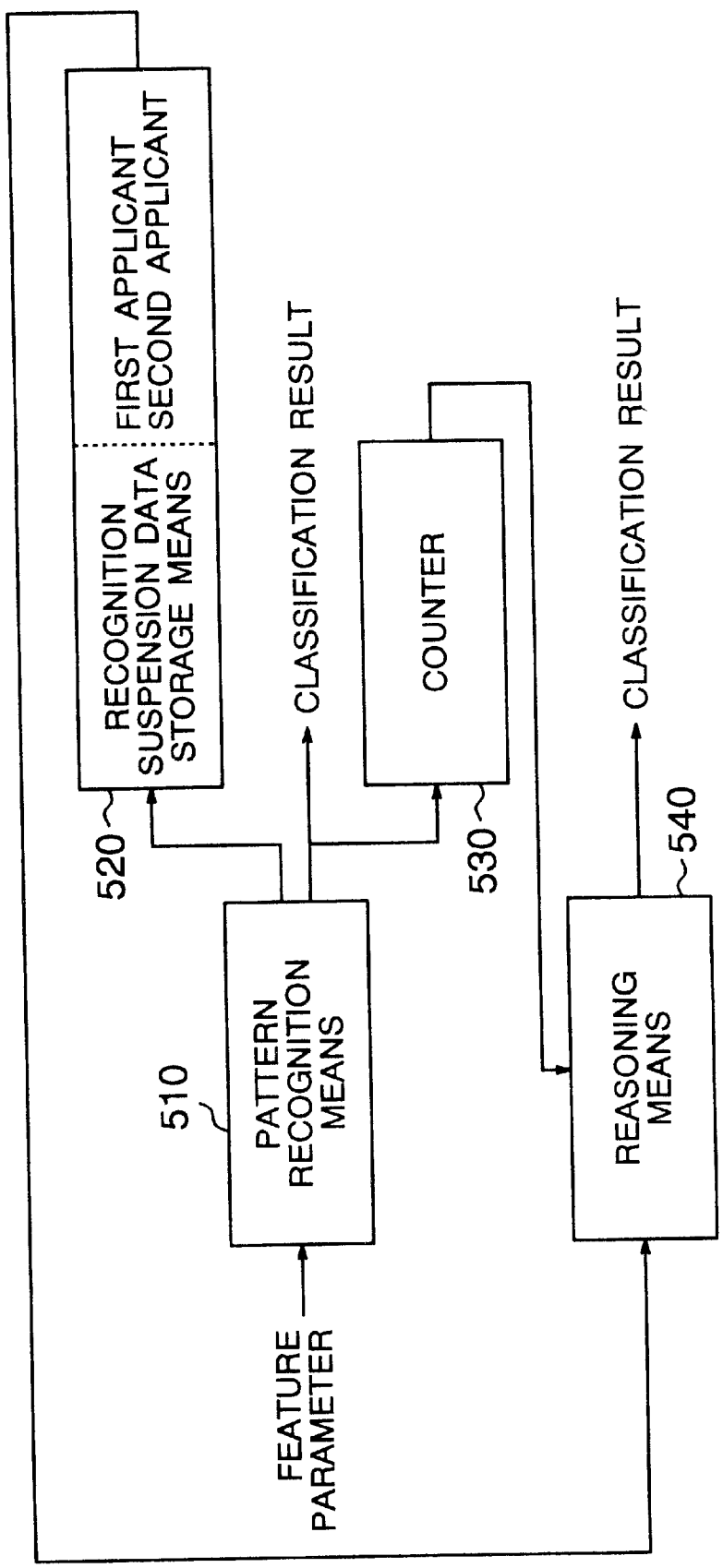
FIG. 12 is a diagram showing the construction of the fifth embodiment of the present invention.
Figure 13:
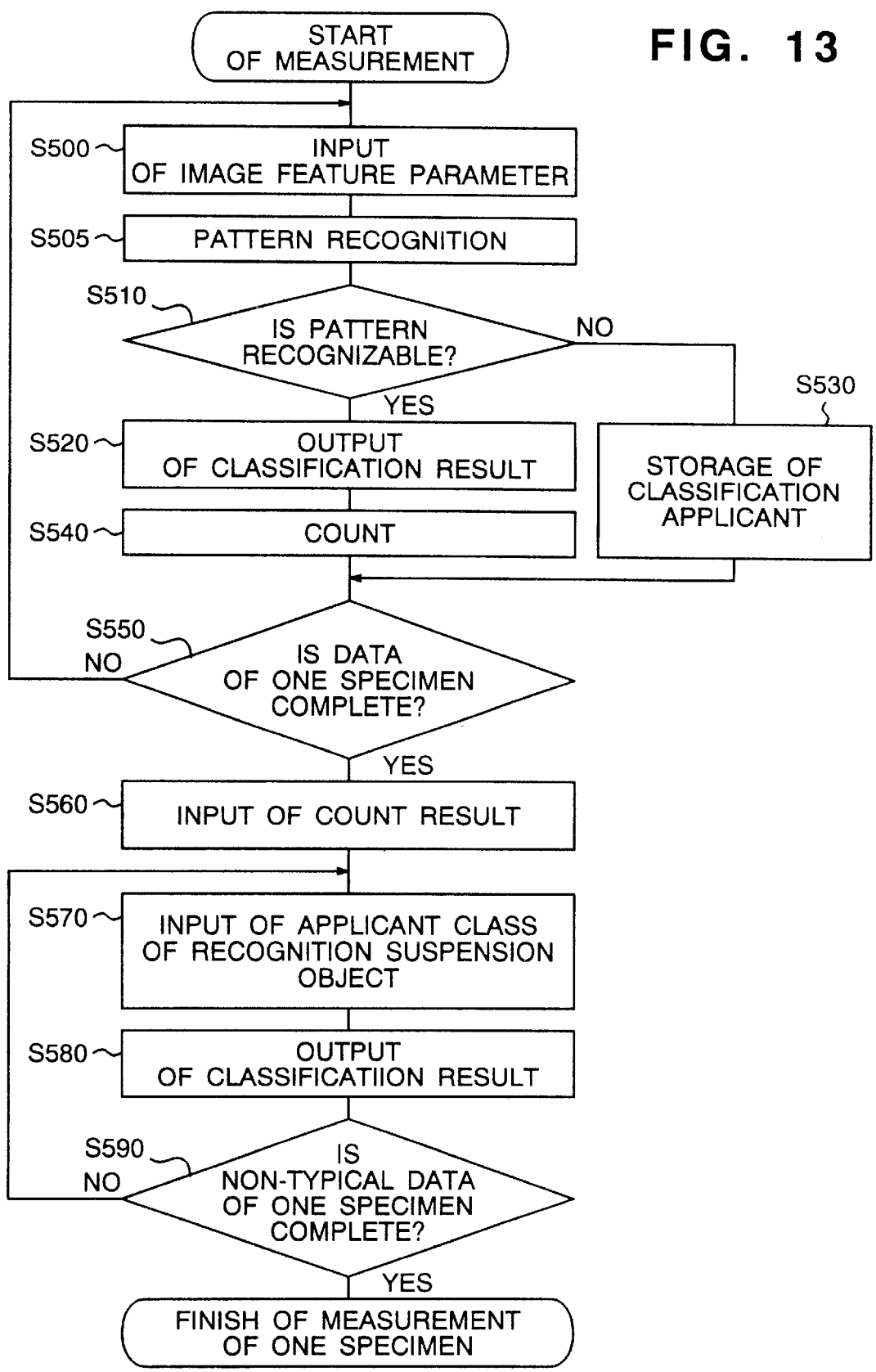
FIG. 13 is a flowchart showing a process flow of the fifth embodiment of the present invention.

FIG. 12 shows the construction of the pattern recognition unit 640 according to the fifth embodiment shown in FIG. 5 and FIG. 13 shows its process flow. In this fifth embodiment, the image feature parameter is inputted to the pattern recognition means 510 (Step S500), pattern recognition is executed (Step S505), and reliability of the resulting recognition result is evaluated so that the recognition result is classified as "recognition suspension" when reliability is low and as "recognizable" when reliability is high (Step S510). When the recognition result is found recognizable, the classification result is outputted (Step S520). When the recognition result is judged as "recognition suspension" in Step S510, the first applicant and the second applicant of the classification class of the object are stored in the classification suspension data storage means 520 (Step S530) and the process is handed over to Step S550. When the neural network is used for the pattern recognition means, for example, the threshold values are set to the maximum output value of the neural network and to the difference between the maximum output value and the second greatest value in the same way as the method explained by the explanation of the Step S110 of the first embodiment shown in FIG. 7, so that reliability of recognition can be evaluated. When the recognition result is "recognition suspension", the classification class corresponding to the output neuron that outputs the maximum output value is outputted as the first applicant of classification of the object and the classification class corresponding to the output neuron that outputs the second greatest value, as the second applicant. When the pattern recognition method based on the statistical decision theory is used for the pattern recognition means 510, the objects which are rejected by discrimination rejection described above are handled as the recognition suspension objects having low reliability of recognition and the objects which are not rejected and for which the recognition result is outputted are handled as the recognizable objects having high reliability of recognition. The pattern recognition method based on the statistical decision theory generally uses the discriminating function corresponding to each classification class and outputs the classification class corresponding to the discriminating function that outputs the maximum value as the recognition result. Therefore, as to those objects which are judged as "discriminating suspension", the classification class corresponding to the discriminating function that outputs the maximum value is used as the first applicant of classification and the class corresponding to the discriminating function that outputs the second greatest value is used as the second applicant of classification. The counter 530 counts how many objects in each classification class appear. When the classification result of the recognizable object is outputted in Step S520, the counter 530 increases the count number of its classification class (Step S540). Whether or not the processes from Step S500 on are complete for all the object images in one specimen is judged in Step S550, and if it is not complete, the processes from Step S500 on are repeated for the remaining object images. If it is complete, the process shifts to Step S560. In this Step S560, the content of the counter 530 is inputted to the reasoning means 540. In Step S570, the first and second applicants of classification of the recognition suspension objects stored in the recognition suspension data storage means 520 are inputted to the reasoning means 540, and the reasoning means 540 decides and outputs the classification result of the recognition suspension object by using the content of the counter inputted in Step S560 (Step S580).

It is rare in the automated urinary sediment examination system that the objects of all the classification items appear in one specimen, and the rule in which the objects of specific classification items appear is determined depending on the kind of diseases and troubles. For example, when the classification suspension objects appears whose first applicant is the red blood cell and whose second applicant is the white blood cell, the appearance state of the classifiable objects is examined. If not a single red blood cell is detected in the specimen but a large number of white blood cells are detected, it is possible to judge that the classification suspension object has a high possibility of the white blood cell. It is known empirically that a statistical correlation exists among the number of appearances of various kinds of objects. When a cast appears, for example, there is a high possibility that any trouble occurs in the renal tubule, and the probability of appearance of the renal tubular epithelial cell in the sediment is high. There is the rule that when the white blood cell appears, an infectious disease is doubted and the probability of appearance of bacteria in the sediment is high. For example, when the classification suspension object the first applicant of which is the renal tubular epithelial cell and the second applicant of which is the white blood cell exists, the possibility is high that the classification suspension object is the renal tubular epithelial cell if the hyaline cast is detected as a classifiable object and the white blood cell is not detected. When the classification suspension object the first applicant of which is an amorphous crystal and the second applicant of which is bacteria exists, the possibility is high that the classification suspension object is the bacteria if the white blood cell is detected as a classifiable object and the amorphous crystal is not detected. The reasoning means 540 selects the classification result of the classification suspension object from the first and second applicants by using the content of the counter 530 in accordance with the rule typified by these examples, and outputs the classification result. Whether or not the processes from Step S570 on are complete for all the classification suspension objects in the specimen is judged in Step S590. If they are not complete, the processes from Step S570 on are repeated for the remaining classification suspension objects and if they are complete, the processes for this specimen are complete.

Although the embodiments of the present invention have been explained about the application to the automated urinary sediment examination system by way of example, the application range of the present invention is not particularly limited to the automated urinary sediment examination system. When patterns having the individual difference are recognized such as in character recognition, speech recognition, etc., the present invention eliminates automatically the influences of the individual difference, re-constructs an optimum recognition logic and accomplishes pattern recognition having high accuracy.

The present invention once executes pattern recognition, re-classifies the objects having low reliability by using the information of the objects having high reliability of the recognition result, reduces the wrong classification of the objects due to the individual difference, automatically eliminates the influences of the individual difference and can accomplish pattern recognition having high accuracy. The objects appearing in the urinary sediment examination have large individual differences and exhibit remarkably different forms and color tones depending on the specimens even when they ought to be classified into the same item. Therefore, there is the case where classification is difficult by watching the object alone. The pattern recognition technology according to the prior art determines what the object is from the information obtained from one object image and for this reason, cannot easily and correctly classify such an object. However, the present invention, when applied, can classify such an object with high accuracy.

What is claimed is:

1. A pattern recognition apparatus comprising:

first pattern recognition means for classifying a plurality of inputted patterns to classification classes to which said patterns belong, evaluating reliability of the classification result and outputting the classification classes to which said pattern belong, as recognizable, for those of said patterns which provide the classification result having high reliability;

first storage means for storing those of said patterns for which said classification results are evaluated as having low reliability by said first pattern recognition means and for which recognition is suspended;

second storage means for storing those of said patterns for which said classification results are evaluated as having high reliability by said first pattern recognition means and said classification classes outputted by said first pattern recognition means;

second pattern recognition means for inputting said patterns stored in said first storage means and outputting said classification classes to which said patterns belong by using said patterns and said classification classes stored in said second storage means as a training sample; and pattern recognition method construction means for constructing said second pattern recognition means by using said patterns and said classification classes stored in said second storage means as a training sample.

2. A pattern recognition apparatus according to claim 1, which further comprises reference pattern recognition method storage means for storing the initial state of said second pattern recognition means, and wherein said second pattern recognition means is initialized by using the content of said reference pattern recognition method storage means before said pattern recognition method construction means constructs said second pattern recognition means.

3. A pattern recognition apparatus according to claim 2, wherein said second pattern recognition means is a neural network, and the number of layers of said neural network, the number of neurones of each layer and a weight value between said neurons are stored in said reference pattern recognition method storage means.

4. A pattern recognition apparatus according to claim 1, wherein said second pattern recognition means is a neural network, and said pattern recognition method construction means is neural network training means.

5. A pattern recognition apparatus comprising:

pattern recognition means being set to an initial state before a plurality of patterns are inputted, for classifying said patterns to classification classes to which said patterns belong, evaluating reliability of the classification result and outputting the classification classes to which said patterns belong, as recognizable for those of said patterns which provide the classification result having high reliability;

first storage means for storing those of said patterns for which said classification results are evaluated as having low reliability and recognition of which is suspended;

second storage means for storing those of said patterns for which said classification results are evaluated as having high reliability by said pattern recognition means and said classification classes outputted from said pattern recognition means;

pattern recognition method adjustment means for optimizing said pattern recognition means by using said patterns and said classification classes stored in said second storage means as a training sample; and reference pattern recognition method storage means for storing the initial state of said pattern recognition means;

wherein:

after said pattern recognition means is optimized by said pattern recognition method adjustment means, said patterns stored in said first storage means are inputted to said pattern recognition means and said classification classes to which said patterns belong are outputted.

6. A pattern recognition apparatus according to claim 5, wherein said pattern recognition means is a neural network.

7. A pattern recognition apparatus according to claim 5, wherein said pattern recognition means is a neural network, the number of layers of said neural network, the number of neurons of each layer and a weight value between said neurons are stored in said reference pattern recognition method storage means, and said pattern recognition method adjustment means is neural network training means.

8. A pattern recognition apparatus comprising:

pattern storage means for storing a plurality of patterns;

a neural network for executing pattern recognition;

reliability evaluation means for evaluating reliability of the pattern recognition result of said patterns by the output value of said neural network;

initial weight value storage means for storing the number of layers of said neural network, the number of neurons of each layer and a weight value of each neuron under the initial state of said neural network;

neural network training means for training said neural network; and pattern recognition result storage means for storing the pattern recognition result;

wherein:

after a plurality of said patterns are stored in said pattern storage means and said neural network is initialized in accordance with the content of said initial weight value storage means;

(a) a process for executing pattern recognition by inputting said patterns stored in said pattern storage means to said neural network;

(b) a process for storing said pattern recognition result in said pattern recognition result storage means;

(c) a process for evaluating reliability of said pattern recognition result of said patterns by using the output value of said neural network by said reliability evaluation means; and (d) a process for executing training of said neural network for said patterns evaluated as having high reliability by said neural network training means by using said pattern recognition result of said patterns as a desired output;

are executed for all of said patterns stored in said pattern storage means, and after the processes from said item (a) to said item (d) are repeated until reliability of all of said pattern recognition result of said patterns is evaluated as being high by said neural network or until a predetermined number of times is reached, said pattern recognition result stored in said pattern recognition result storage means is outputted.

9. A pattern recognition apparatus comprising:

pattern recognition means for classifying a plurality of inputted pattern to classification classes to which said patterns belong, evaluating reliability of the classification result, outputting said classification result as recognizable for those of said patterns which provides said classification result having high reliability, suspending recognition for those of said patterns for which said classification results have low reliability, and outputting a first applicant and a second applicant of said classification class to which said patterns are to be classified;

storage means for storing said first applicant and said second applicant;

a counter for counting the number of each kind of objects for which said classification class is outputted by said pattern recognition means; and reasoning means for deciding said classification class of said patterns by using the content of said counter and said first applicant and said second applicant stored in said storage means.

10. A pattern recognition method comprising:

a first step for executing first pattern recognition by classifying a plurality of patterns to classification classes to which said pattern belong, evaluating reliability of the classification result, and obtaining the classification classes to which said patterns belong, as recognizable, for those of said patterns which provide said classification result having high reliability;

a second step for storing those of said patterns for which said classification results are evaluated as having low reliability and recognition of which is suspended by said first step in first storage means;

a third step for storing said patterns for which said classification results are evaluated as having high reliability and said classification classes by said first step in second storage means;

a fourth step for obtaining said classification classes to which said pattern belong, from said patterns stored in said first storage means by using said patterns and said classification classes stored in said second storage means as a training sample; and a fifth step for constructing said second pattern recognition by using said patterns and said classification classes stored in said second storage means as a training sample.

11. A pattern recognition method comprising:
a first step being set to an initial state before a plurality of patterns are inputted, for classifying said patterns to classification classes to which said patterns belong, evaluating the classification result and obtaining said classification classes to which said patterns belong, for those of said patterns for which the classification result having high reliability is obtained, as recognizable;
a second step for storing those of said patterns for which said classification results are evaluated as having low reliability and recognition of which is suspended by said first step in first storage means;
a third step for storing those of said patterns for which said classification results are evaluated as having high reliability and said classification classes obtained by said first step in second storage means;
a fourth step for optimizing said first step by using said patterns and said classification classes stored in said second storage means as a training sample; and
a fifth step for determining said classification classes to which said patterns belong, by using said patterns stored in said first storage means after said first step is optimized by said fourth step.

12. A pattern recognition method comprising:
a first step for storing a plurality of patterns in storage means and initializing the number of layers of a neural network, the number of neurons of each layer and a weight value of each neuron;
a second step for obtaining a pattern recognition result of said patterns by said neural network;
a third step for evaluating reliability of said pattern recognition result by the output value of said neural network;
a fourth step for training said neural network; and
a fifth step for storing said pattern recognition result in pattern recognition result storage means;
wherein:
(a) a step for inputting said patterns stored in said storage means to said neural network and the process of said second step;
(b) the process of said fifth step;
(c) the process of said third step; and
(d) the process of said fourth step for executing training of said neural network by using said pattern recognition result of said patterns for which said classification results are evaluated as having high reliability as a desired output;
are executed for all of said patterns stored in said pattern storage means, and after the processes from said step (a) to said step (d) are repeated until said pattern recognition result of all of said patterns is evaluated as having high reliability by said neural network or until a predetermined number of times is reached, said pattern recognition result stored in said pattern recognition result storage means is outputted.

13. A pattern recognition method comprising:
a first step for classifying a plurality of inputted patterns to classification classes to which said patterns belong, evaluating reliability of the classification result, obtaining said classification classes for those of said patterns which provide said classification result having high reliability as recognizable, suspending recognition for those of said patterns for which said classification results have low reliability, and obtaining a first applicant and a second applicant of said classification classes to which said patterns are to be classified;
a second step for counting the number of objects of said classification classes obtained by said first step for each classification class, and storing said first applicant and said second applicant obtained by said first step in storage means; and
a third step for deciding said classification class of said pattern by using the number counted by said second step and said first applicant and said second applicant stored in said storage means.

14. An automated urinary sediment examination system comprising:
a flow cell for forming a flat flow of a urine sample:
laser beams to be irradiated to said flow cell;
a particle detector for detecting the passage of solid components flowing through said flow cell;
a pulse lamp for irradiating light to said flow cell in synchronism with the detection signal representing the passage of said solid components by said particle detector;
a color television camera for imaging the images of said solid components as a still image;
an image processor for classifying said solid components in said still image and measuring the amount of each kind of sediment components in said urine sample; and
an output device for outputting the amount of each kind of said sediment components;
said image processor including an A/D converter for converting analog image signals from said color television camera to digital image data, a region segmentation unit for segmenting said digital image data to a background region and an object region including said sediment components, a feature parameter calculation unit for calculating a feature parameter of said object region, a pattern recognition unit for executing recognition of said sediment components by inputting a pattern of said feature parameter as an input and classifying said sediment components to a classification item and a counter for counting the number of said sediment components classified to each of said classification items;
wherein:
said pattern recognition unit comprises:
a first pattern recognition unit for classifying a plurality of said patterns inputted to classification classes to which said patterns belong, evaluating reliability of the classification result and outputting those of said patterns which provide said classification result having high reliability as recognizable to said classification class to which said pattern belong;
a first storage unit for storing those of said patterns for which said classification results are evaluated as having low reliability and recognition of which is suspended by said first pattern recognition unit;
a second storage unit for storing those of said patterns for which said classification results are evaluated as having high reliability by said first pattern recognition unit and said classification classes outputted by said first pattern recognition unit;
a second recognition unit for inputting said patterns stored in said first storage unit and outputting said classification class to which said patterns belong by using said patterns and said classification class stored in said second storage unit as a training sample; and
a pattern recognition method constitution unit for constructing said second pattern recognition unit by using said patterns and said classification classes stored in said second storage unit as a training sample.

15. An automated urinary sediment examination system according to claim 14, which further comprises a reference pattern recognition method storage unit for storing an initial state of said second pattern recognition unit, and wherein said second pattern recognition unit is initialized by using the content of said reference pattern recognition unit before said pattern recognition method construction unit constructs said second pattern recognition method.

16. An automated urinary sediment examination system according to claim 15, wherein said second pattern recognition unit is a neural network, and the number of layers of said neural network, the number of neurons of each layer and a weight value between said neurons are stored in said reference pattern recognition method storage unit.

17. An automated urinary sediment examination system according to claim 14, wherein said second pattern recognition unit is a neural network, and said pattern recognition method construction unit is neural network training means.

18. An automated urinary sediment examination system comprising:
- a flow cell for forming a flat flow of a urine sample:
  laser beams to be irradiated to said flow cell;
  - a particle detector for detecting the passage of solid components flowing through said flow cell;
  - a pulse lamp for irradiating light to said flow cell in synchronism with a detection signal of the passage of said solid components by said particle detector;
  - a color television camera for imaging the image of said solid components as a still image;
  - an image processor for classifying said solid components in said still image and measuring the amount of each kind of sediment components in said urine sample; and
  - an output device for outputting the amount of each kind of said sediment components;
  - said image processor including an A/D converter for converting analog image signals from said color television camera to digital image data, a region segmentation unit for segmenting said digital image data into a background region and an object region including said sediment components, a feature parameter calculation unit for calculating a feature parameter of said object region, a pattern recognition unit for inputting patterns of said feature parameter, executing recognition of said sediment components and classifying them into classification classes, and a counter for counting the number of said sediment components classified into each of said classification items;

wherein:
said pattern recognition unit includes:
- a first pattern recognition unit being set to an initial state before a plurality of said patterns are inputted, for classifying said patterns to classification classes to which said patterns belong, evaluating reliability of the classification result, and outputting the classification class to which said patterns belong, for those of said patterns which provide the classification result having high reliability as recognizable;
- a first storage unit for storing those of said patterns for which said classification results are evaluated as having low reliability and recognition of which is suspended by said first pattern recognition unit;
- a second storage unit for storing those of said patterns for which said classification results are evaluated as having high reliability by said first pattern recognition unit and said classification classes outputted by said first pattern recognition unit;
- a pattern recognition method adjustment unit for optimizing said first pattern recognition unit by using said patterns and said classification classes stored in said second storage unit as a training sample; and
- a reference pattern recognition method storage unit for storing an initial state of said first pattern recognition unit; and wherein:
said patterns stored in said first storage unit is inputted to said first pattern recognition unit after said first pattern recognition unit is optimized by said pattern recognition method adjustment unit, and said classification classes to which said patterns belong are outputted.

19. An automated urinary sediment examination system according to claim 18, wherein said first pattern recognition unit is a neural network.

20. An automated urinary sediment examination system according to claim 18, wherein said first pattern recognition unit is a neural network, the number of layers of said neural network, the number of neurons of each of said layers and a weight value between said neurons are stored in said reference pattern recognition method storage unit, and said pattern recognition method adjustment unit is neural network training means.

21. An automated urinary sediment examination system comprising:
- a flow cell for forming a flat flow of a urine sample:
  laser beams to be irradiated to said flow cell;
  - a particle detector for detecting the passage of solid components flowing through said flow cell;
  - a pulse lamp for irradiating light to said flow cell in synchronism with a detection signal of the passage of said solid components by said particle detector;
  - a color television camera for imaging the images of said solid components as a still image;
  - an image processor for classifying said solid components in said still image and measuring the amount of each kind of said sediment components in said urine sample; and
  - an output device for outputting the amount of each kind of said sediment components;
  - said image processor including an A/D converter for converting analog image signals from said color television camera to digital image data, a region segmentation unit for segmenting said digital image data into a background region and an object region including said sediment components, a feature parameter calculation unit for calculating a feature parameter of said object region, a pattern recognition unit for inputting the patterns of said feature parameter, executing recognition of said sediment components and classifying them to classification items and a counter for counting the number of said sediment components classified into each of said classification items;

wherein:
said pattern recognition unit includes:
- a pattern storage unit for storing a plurality of patterns;
- a neural network for executing pattern recognition;
- a reliability evaluation unit for evaluating reliability of a pattern recognition result of said patterns from the output value of said neural network;
- an initial weight value storage unit for storing the number of layers of said neural network in an initial state, the number of neurons of each of said layers and a weight value of each of said neurons;
- neural network training means for executing training of said neural network; and a pattern recognition result storage unit for storing said pattern recognition result; and wherein:

after a plurality of said patterns are stored in said pattern storage unit and said neural network is initialized in accordance with the content of said initial weight value storage unit;

(a) a process for executing pattern recognition by inputting said patterns stored in said pattern storage unit to said neural network;

(b) a process for storing said pattern recognition result in said pattern recognition result storage unit;

(c) a process for evaluating reliability of said pattern recognition result by said reliability evaluation unit by using the output value of said neural network; and (d) a process for executing training of said neural network by said neural network training means by using said pattern recognition result of said patterns for those of said patterns for which said classification results are evaluated as having high reliability;

are executed for all of said patterns stored in said pattern storage unit, and after said process (a) to said process (d) are repeated until reliability of said pattern recognition result of all of said patterns is evaluated as high by said neural network or until a predetermined number of times is reached, said pattern recognition result stored in said pattern recognition result storage unit is outputted.

22. An automated urinary sediment examination system comprising:

a flow cell for forming a flat flow of a urine sample;

laser beams to be irradiated to said flow cell;

a particle detector for detecting the passage of solid components flowing through said flow cell;

a pulse lamp for irradiating light to said flow cell in synchronism with a detection signal of the passage of said solid components by said particle detector;

a color television camera for imaging the images of said solid components as a still image;

an image processor for classifying said solid components in said still image and measuring the amount of each kind of sediment components in said urine sample; and an output device for outputting the amount of each kind of said sediment components;

said image processor including an A/D converter for converting analog image signals from said color television camera to digital image data, a region segmentation unit for segmenting said digital image data to a background region and an object region including said sediment components, a feature parameter calculation unit for calculating a feature parameter of said object region, a pattern recognition unit for executing recognition of said sediment components by inputting patterns of said feature parameter and classifying them into classification items and a counter for counting the number of said sediment components classified into each of said classification items;

wherein:

said pattern recognition unit includes:

a first pattern recognition unit for classifying a plurality of said patterns inputted to classification classes to which said patterns belong, evaluating reliability of the classification result, outputting said classification class as recognizable for those of said patterns which provide said classification result having high reliability, suspending recognition for those of said patterns for which said classification results have low reliability, and outputting a first applicant and a second applicant of said classification class to which said patterns are to be classified;

a storage unit for storing said first applicant and said second applicant;

a counter for counting the number of objects for which said classification class is outputted by said first pattern recognition unit, for each classification class; and reasoning means for deciding said classification class of said patterns by using the content of said counter and said first applicant and said second applicant stored in said storage unit.

23. An automated urinary sediment examination method including:

a step of forming a flat flow of a urine sample in a flow cell;

a step of irradiating laser beams to said flow cell;

a step of detecting the passage of solid components flowing through said flow cell;

a step of irradiating pulse lamp light to said flow cell in synchronism with the detection of the passage of said solid components;

a step of imaging the image of said solid components as a still image by a color television camera;

a step of classifying said solid components in said still image and measuring the amount of each kind of sediment components in said urine sample; and a step of outputting the amount of each kind of said sediment components;

said image processing step including:

a step of converting analog image signals from said color television to digital image data;

a step of segmenting said digital image data to a background region and an object region including said sediment components;

a step of calculating a feature parameter of said object region;

a step of executing pattern recognition to recognize said sediment components and to classify them into classification items; and a step of counting the number of said sediment components classified to each of said classification items;

wherein:

said automated urinary sediment examination method comprises:

a first step of classifying a plurality of said patterns to classification classes to which said patterns belong, evaluating reliability of the classification result and obtaining the classification class to which said patterns belong, as recognizable for those of said patterns which provide said classification result having high reliability;

a second step of storing those of said patterns for which said classification results are evaluated as having low reliability and recognition of which is suspended in a first storage unit;

a third step of storing said patterns for which said classification results are evaluated as having high reliability by said first step and said classification class in a second storage unit;

a fourth step of executing second pattern recognition to obtain said classification class to which said patterns belong, from said patterns stored in said first storage unit by using said patterns and said classification class stored in said second storage unit as a training sample; and a fifth step of constructing said second pattern recognition by using said patterns and said classification class stored in said second storage unit as a training sample.

24. An automated urinary sediment examination method including:

a step of forming a flat flow of a urine sample in a flow cell;

a step of irradiating laser beams to said flow cell;

a step of detecting the passage of solid components flowing through said flow cell;

a step of irradiating pulse lamp light to said flow cell in synchronism with the detection of the passage of said solid components;

a step of imaging the image of said solid components as a still image by a color television camera;

a step of executing an image processing for classifying said solid components in said still image and measuring the amount of each kind of sediment components in said urine sample; and a step of outputting the amount of each kind of said sediment components;

said image processing step including:

a step of converting analog image signals from said color television camera to digital image data;

a step of segmenting said digital image data into a background region and an object region including said sediment components;

a step of calculating a feature parameter of said object region; and a step of executing pattern recognition to recognize said sediment components and to classify them into classification items by inputting the patterns of said feature parameter;

wherein:

said step of executing pattern recognition includes:

a first step being set to an initial state before a plurality of said patterns are inputted, for classifying said patterns to classification classes to which said patterns belong, evaluating reliability of the classification result, and obtaining the classification class to which said patterns belong, as recognizable for those of said patterns which provide the classification result having high reliability;

a second step of storing those of said patterns for which said classification results are evaluated as having low reliability by said first step and recognition of which is suspended, in a first storage unit;

a third step of storing those of said patterns for which said classification results are evaluated as having high reliability by said first step and said classification class obtained by said first step in a second storage unit;

a fourth step of optimizing said first step by using said patterns and said classification classes stored in said second storage unit as a training sample; and a fifth step of deciding said classification class to which said patterns belong, by using said patterns stored in said first storage unit after said first step is optimized by said fourth step.

25. An automated urinary sediment examination method including:

a step of forming a flat flow of a urine sample in a flow cell;

a step of irradiating laser beams to said flow cell;

a step of detecting the passage of solid components flowing through said flow cell;

a step of irradiating pulse lamp light to said flow cell in synchronism with the detection of the passage of said solid components;

a step of imaging the image of said solid components as a still image by a color television camera;

a step of executing image processing for classifying said solid components in said still image and measuring the amount of each kind of sediment components in said urine sample; and a step of outputting the amount of each kind of said sediment components;

said image processing step including:

a step of converting analog image signals from said color television camera to digital image data;

a step of segmenting said digital image data into a background region and an object region including said sediment components;

a step of calculating a feature parameter of said object region;

a step of executing pattern recognition to recognize said sediment components by using the patterns of said feature parameter as an input and classifying them into classification items; and a step of counting the number of said sediment components classified into each of said classification items;

wherein:

said pattern recognition step includes:

a first step of storing a plurality of said patterns in a storage unit, and initializing the number of layers of a neural network, the number of neurons of each layer and a weight value of each neuron;

a second step of obtaining a pattern recognition result of said patterns by said neural network;

a third step of evaluating reliability of said pattern recognition result of said patterns by an output value of said neural network;

a fourth step of executing training of said neural network; and a fifth step of storing said pattern recognition result in a pattern recognition result storage unit; and wherein:

(a) a processes of a step of inputting said patterns stored in said storage unit to said neural network and said second step;

(b) a process of said fifth step;

(c) a process of said third step; and (d) a process of said fourth step of executing training of said neural network by using said pattern recognition result of said patterns for which said classification results are evaluated as having high reliability as a desired output;

are executed for all of said patterns stored in said storage unit, and after the processes from said item (a) to said item (d) are repeated until reliability of said pattern recognition result of all of said patterns is evaluated as high by said neural network or until a predetermined number of times is reached, said pattern recognition result stored in said pattern recognition result storage unit is outputted.

26. An automated urinary sediment examination method including:

a step of forming a flat flow of a urine sample in a flow cell;

a step of irradiating laser beams to said flow cell;

a step of detecting the passage of solid components flowing through said flow cell;

a step of irradiating pulse lamp light to said flow cell in synchronism with the detection of the passage of said solid components;

a step of imaging the image of said solid components as a still image by a color television camera;

a step of executing an image processing for classifying said solid components in said still image and measuring the amount of each kind of sediment components in said urine sample; and a step of outputting the amount of each kind of said sediment components;

said image processing step including:

- a step of converting analog image signals from said color television camera to digital image data;
- a step of segmenting said digital image data into a background region and an object region including said sediment components;
- a step of calculating a feature parameter of said object region;
- a step of executing pattern recognition to recognize said sediment components by using the patterns of said feature parameter as an input and to classify them into classification items; and
- a step of counting the number of said sediment components classified to each of said classification items;

wherein:

said pattern recognition step includes:

- a first step of classifying a plurality of said patterns inputted to classification classes to which said patterns belong, evaluating reliability of the classification result, obtaining said classification class as recognizable for those of said patterns which provide said classification result having high reliability, suspending recognition for those of said patterns for which said classification results have low reliability, and obtaining a first applicant and a second applicant of said classification class to which said patterns are to be classified;
- a second step of counting the number of objects of said classification classes obtained by said first step for each of said classification classes, and storing said first applicant and said second applicant obtained by said first step in a storage unit; and
- a third step of deciding said classification class of said patterns by using the number counted by said second step and said first applicant and said second applicant stored in said storage unit.

* * * * *